United States Patent
Levy

(10) Patent No.: US 11,348,162 B2
(45) Date of Patent: May 31, 2022

(54) ACQUIRING ADDITIONAL PRODUCTS FROM A PROVIDER

(71) Applicant: Digiprint IP LLC, Longboat Key, FL (US)

(72) Inventor: Avery Levy, Longboat Key, FL (US)

(73) Assignee: Digiprint IP LLC, Longboat Key, FL (US)

( * ) Notice: Subject to any disclaimer, the term of this patent is extended or adjusted under 35 U.S.C. 154(b) by 0 days.

(21) Appl. No.: 15/462,727

(22) Filed: Mar. 17, 2017

(65) Prior Publication Data

US 2018/0268468 A1 Sep. 20, 2018

(51) Int. Cl.
*G06Q 30/00* (2012.01)
*G06Q 30/06* (2012.01)
*G06F 3/0482* (2013.01)

(52) U.S. Cl.
CPC ..... *G06Q 30/0641* (2013.01); *G06Q 30/0603* (2013.01); *G06Q 30/0631* (2013.01); *G06F 3/0482* (2013.01); *G06Q 30/0633* (2013.01)

(58) Field of Classification Search
CPC .......... G06Q 30/0641; G06Q 30/0603; G06Q 30/0631; G06Q 30/0633; G06F 3/0482
See application file for complete search history.

(56) References Cited

U.S. PATENT DOCUMENTS

| | | | |
|---|---|---|---|
| 5,572,653 A | 11/1996 | Detemple et al. | |
| 5,903,721 A | 5/1999 | Sixtus | |
| 6,317,722 B1 | 11/2001 | Jacobi et al. | |
| 6,587,835 B1* | 7/2003 | Treyz | G06Q 20/12 705/14.64 |
| 6,978,273 B1 | 12/2005 | Bonneau et al. | |
| 7,035,828 B2 | 4/2006 | Ketonen et al. | |

(Continued)

FOREIGN PATENT DOCUMENTS

| | | |
|---|---|---|
| WO | WO 2018/170326 | 9/2018 |
| WO | WO 2018/170407 | 9/2018 |

OTHER PUBLICATIONS

"Avoiding the crowds in the stores," by Kit Eaton, International New York Times (Paris), Nov. 27, 2015, p. 17 (Year: 2015).*

(Continued)

*Primary Examiner* — Anne M Georgalas
(74) *Attorney, Agent, or Firm* — Polsinelli LLP

(57) ABSTRACT

The present disclosure relates to methods and apparatus where information relating to products and services offered by various vendors may be offered for sale to customers via computing devices owned by those customers. Products and services offered to a particular customer may be related to a product previously purchased by that customer or be related to a product that a customer has access to. In certain instances, a product that a customer has access to may include a tag, such as a circuit, a chip, or printed matter that may provide information to an electronic device of a customer. After the customer's device received the information provided by the product tag, other products or services related to the tagged product may be received by the customer device. Methods consistent with the present disclosure may allow a user of a user device to interact with various different graphical user interfaces when making purchases.

26 Claims, 20 Drawing Sheets

(56) References Cited

U.S. PATENT DOCUMENTS

| | | | |
|---|---|---|---|
| 7,063,263 B2* | 6/2006 | Swartz | G06K 17/00 |
| | | | 235/462.45 |
| 7,231,380 B1 | 6/2007 | Pienkos | |
| 7,299,202 B2 | 11/2007 | Swanson | |
| 7,356,490 B1* | 4/2008 | Jacobi | G06Q 30/0601 |
| | | | 705/26.8 |
| 7,702,545 B1* | 4/2010 | Compton | G06Q 30/0639 |
| | | | 705/26.9 |
| 8,473,341 B1* | 6/2013 | Walker | G06Q 30/0207 |
| | | | 705/14.34 |
| 9,619,831 B1 | 4/2017 | Kumar et al. | |
| 9,813,882 B1* | 11/2017 | Masterman | H04W 4/18 |
| 9,898,746 B2* | 2/2018 | Argue | G06Q 30/02 |
| 10,134,077 B2 | 11/2018 | Levy | |
| 10,580,026 B2 | 3/2020 | Levy | |
| 11,062,356 B2 | 7/2021 | Levy | |
| 11,157,953 B2 | 10/2021 | Levy | |
| 2003/0154135 A1* | 8/2003 | Covington | G06Q 30/00 |
| | | | 705/26.8 |
| 2005/0189415 A1 | 9/2005 | Fano et al. | |
| 2006/0163349 A1 | 7/2006 | Neugbauer | |
| 2006/0235721 A1 | 10/2006 | Kavanagh et al. | |
| 2007/0138268 A1 | 6/2007 | Tuchman | |
| 2009/0030787 A1 | 1/2009 | Pon et al. | |
| 2009/0094260 A1* | 4/2009 | Cheng | G06Q 30/02 |
| 2010/0174599 A1 | 7/2010 | Rosenblatt et al. | |
| 2010/0250336 A1 | 9/2010 | Selinger et al. | |
| 2011/0093361 A1* | 4/2011 | Morales | G06Q 10/087 |
| | | | 705/26.62 |
| 2011/0137715 A1 | 6/2011 | O'Shea et al. | |
| 2011/0137742 A1 | 6/2011 | Parikh et al. | |
| 2011/0145093 A1* | 6/2011 | Paradise | G06Q 30/0613 |
| | | | 705/26.41 |
| 2011/0173055 A1 | 7/2011 | Ross et al. | |
| 2011/0191181 A1* | 8/2011 | Blackhurst | G06Q 30/0255 |
| | | | 705/14.53 |
| 2011/0196732 A1 | 8/2011 | Schueller et al. | |
| 2011/0226853 A1 | 9/2011 | Soh et al. | |
| 2011/0246293 A1 | 10/2011 | Hayward et al. | |
| 2012/0085828 A1 | 4/2012 | Ziegler | |
| 2012/0271712 A1 | 10/2012 | Katzin et al. | |
| 2013/0002405 A1* | 1/2013 | Pesonen | H04B 5/00 |
| | | | 340/10.5 |
| 2013/0059534 A1 | 3/2013 | Sobalvarro et al. | |
| 2013/0134213 A1 | 6/2013 | Pallakoff et al. | |
| 2013/0191213 A1 | 7/2013 | Beck et al. | |
| 2013/0218671 A1 | 8/2013 | Khan et al. | |
| 2013/0246190 A1 | 9/2013 | Lee | |
| 2013/0282466 A1 | 10/2013 | Hampton | |
| 2013/0282533 A1 | 10/2013 | Foran-Owens et al. | |
| 2013/0325644 A1* | 12/2013 | Sivaraman | H04N 21/2408 |
| | | | 705/26.1 |
| 2014/0067530 A1 | 3/2014 | Pluche et al. | |
| 2014/0095282 A1 | 4/2014 | Slonimsky et al. | |
| 2014/0129307 A1 | 5/2014 | Walker et al. | |
| 2014/0143055 A1 | 5/2014 | Johnson | |
| 2014/0143086 A1* | 5/2014 | Birsin | G06Q 30/0631 |
| | | | 705/26.7 |
| 2014/0207611 A1* | 7/2014 | Cleary | G06Q 30/0633 |
| | | | 705/26.8 |
| 2014/0316946 A1* | 10/2014 | Sanders | G06Q 30/0633 |
| | | | 705/26.62 |
| 2014/0351082 A1 | 11/2014 | Lowinger | |
| 2015/0095185 A1 | 4/2015 | Katukuri et al. | |
| 2015/0112826 A1 | 4/2015 | Crutchfield | |
| 2015/0206128 A1 | 7/2015 | Torossian et al. | |
| 2015/0278849 A1 | 10/2015 | Reichert | |
| 2015/0294387 A1 | 10/2015 | Karmazyn et al. | |
| 2015/0356660 A1 | 12/2015 | L'Heureux et al. | |
| 2015/0363816 A1 | 12/2015 | Poglitsch | |
| 2016/0055538 A1 | 2/2016 | Todasco | |
| 2016/0171547 A1 | 6/2016 | Sjolund et al. | |
| 2016/0189229 A1 | 6/2016 | Gopalan et al. | |
| 2016/0253705 A1 | 9/2016 | Eom | |
| 2016/0284014 A1 | 9/2016 | Adel | |
| 2017/0039613 A1* | 2/2017 | Kaehler | G02B 27/0172 |
| 2017/0193429 A1 | 7/2017 | Olson | |
| 2017/0221119 A1 | 8/2017 | Pellow et al. | |
| 2018/0268457 A1 | 9/2018 | Levy | |
| 2019/0043072 A1 | 2/2019 | Levy | |
| 2019/0050895 A1 | 2/2019 | Levy | |
| 2019/0050896 A1 | 2/2019 | Levy | |
| 2019/0050908 A1 | 2/2019 | Levy | |
| 2019/0244275 A1 | 8/2019 | Levy | |
| 2020/0193461 A1 | 6/2020 | Levy | |
| 2021/0390584 A1 | 12/2021 | Levy | |

OTHER PUBLICATIONS

"Decide.com Launches iPhone App for Smart Holiday Electronics Shopping: Decide's price & model predictions help in-store shoppers save money, now on all electronics," PR Newswire (New York), Nov. 17, 2011 (Year: 2011).*

"Avoiding the Black Friday Blues," by Brian X Chen, New York Times (Late Edition—East Coast), New York, NY, Nov. 17, 2016 (Year: 2016).*

U.S. Appl. No. 15/462,751, Avery Levy, Upselling System, filed Mar. 17, 2017.

Amazon—Get Free assembly with select home fitness equipment, Jul. 18, 2017.

Ebay Enforces New Picture Requirements, Jun. 4, 2013.

Scan definition 2018.

PCT Application No. PCT/US2018/022879 International Search Report and Written Opinion dated Jun. 7, 2018.

PCT Application No. PCT/US2018/022744 International Search Report and Written Opinion dated Jun. 8, 2018.

U.S. Appl. No. 15/462,751 Office Action dated Mar. 2, 2018.

U.S. Appl. No. 15/462,751 Final Office Action dated Oct. 17, 2017.

U.S. Appl. No. 15/462,751 Office Action dated May 19, 2017.

U.S. Appl. No. 15/672,192 Office Action dated May 18, 2018.

U.S. Appl. No. 15/672,192 Final Office Action dated Jan. 12, 2018.

U.S. Appl. No. 15/672,192 Office Action dated Sep. 11, 2017.

U.S. Appl. No. 15/672,121 Final Office Action dated Apr. 18, 2018.

U.S. Appl. No. 15/672,121 Office Action dated Sep. 8, 2017.

U.S. Appl. No. 15/672,198 Office Action dated May 17, 2018.

U.S. Appl. No. 15/672,198 Final Office Action dated Jan. 12, 2018.

U.S. Appl. No. 15/672,198 Office Action dated Sep. 11, 2017.

U.S. Appl. No. 15/671,013 Office Action dated Dec. 15, 2017.

U.S. Appl. 15/462,751, Avery Levy, Upselling Offerings to Customers, filed Mar. 17, 2017.

U.S. Appl. No. 15/672,193, Avery Levy, System and Method for Tag Based Upselling, filed Aug. 8, 2017.

U.S. Appl. No. 15/672,121, Avery Levy, Method and Apparatus for Linking to an Upsell System Via a Tag, filed Aug. 8, 2017.

U.S. Appl. No. 15/672,198, Avery Levy, System and Method for Upselling Products and Services, filed Aug. 8, 2017.

U.S. Appl. No. 15/671,013, Avery Levy, In Store Upselling, filed Aug. 7, 2017.

Krummert et al., (Krummert, B. (Jul. 25, 2013). Customer smartphones: Make them work for you. Restaurant Hospitality, Retrieved from https://search.proquest.com/docview/1412455375?accountid=14753).

U.S. Appl. No. 15/671,013 Final Office Action dated Jul. 13, 2018.

U.S. Appl. No. 16/195,305, Avery Levy, Upselling to Customers, filed Nov. 19, 2018.

U.S. Appl. No. 15/672,193 Final Office Action dated Mar. 13, 2019.

U.S. Appl. No. 15/672,121 Office Action dated Jan. 25, 2019.

U.S. Appl. No. 15/672,198 Final Office Action dated Mar. 7, 2019.

U.S. Appl. No. 15/671,013 Office Action dated Feb. 26, 2019.

Aamoth, Dough; "Shop Amazon Smarter with These Quick Tricks", Time, Oct. 2, 2014.

U.S. Appl. No. 15/672,121 Final Office Action dated Nov. 21, 2019.

U.S. Appl. No. 15/672,121 Office Action dated Aug. 27, 2020.

U.S. Appl. No. 16/195,305 Office Action dated Jul. 9, 2020.

PCT Application No. PCT/US2018/022879 International Preliminary Report on Patentability dated Sep. 17, 2019.

(56) References Cited

OTHER PUBLICATIONS

PCT Application No. PCT/US2018/022744 International Preliminary Report on Patentability dated Sep. 17, 2019.
U.S. Appl. No. 16/195,305 Final Office Action dated Jan. 8, 2021.
U.S. Appl. No. 16/705,087 Office Action dated Apr. 1, 2021.
Chandler, Michele; "Apple iBeacons Push 'Proximity' Marketing Startup Swirl attracts funding from Twitter, pact with RetailMeNot", Investor's Business Daily; Los Angeles May 11, 215: A09. 5 pages.
U.S. Appl. No. 16/195,305 Office Action dated Jul. 15, 2021.
U.S. Appl. No. 16/705,087 Final Office Action dated Sep. 1, 2021.
U.S. Appl. No. 16/705,087 Office Action dated Dec. 23, 2021.

\* cited by examiner

FIG. 18

ACQUIRING ADDITIONAL PRODUCTS FROM A PROVIDER

BACKGROUND OF THE INVENTION

Field of the Invention

The present invention is generally directed to systems and methods for selling products or services. More specifically, the present invention assists vendors and customers better identify products or services that may be of interest to those customers and initiating the purchase of those products.

Description of the Related Art

Methods and systems for selling products and services to customers today are performed via a variety of means that include direct person to person sales, by phone, or by computer via the internet. These systems and methods are limited as they do not timely or conveniently provide customers with information regarding different products and services sold by various different vendors when customers make decisions relating to purchasing a product that may be related to another product or service.

What are needed are systems and methods that allow products and services sold by various different vendors to be provided to users in a timely and convenient way.

SUMMARY OF THE PRESENTLY CLAIMED INVENTION

The presently claimed invention relates to apparatus, methods, and non-transitory computer readable storage mediums. A method consistent with the present disclosure may receive information from a product tag, display information regarding products that are related to the tagged product in a graphical user interface (GUI), and receive user selections via the GUI, where the related product is available for purchase based on one or more user selections received over the GUI.

A non-transitory computer readable storage medium consistent with the present disclosure may also receive information from a product tag, display information regarding products that are related to the tagged product in a graphical user interface (GUI), and receive user selections via the GUI, where the related product is purchased based on one or more user selections received over the GUI.

Apparatus consistent with the present disclosure may include a memory, a processor that executes instructions out of the memory, an interface that receives tag information from a tag that is associated with a product, and a display that displays information relating to one or more products that are related to the tagged product in a graphical user interface (GUI). Apparatus consistent with the present disclosure may also receive one or more user selections over the GUI, where at least one of the one or more user selections received initiate a purchase of a product that is related to the tagged product based on the user selections received over the GUI.

BRIEF DESCRIPTION OF THE DRAWINGS

FIG. 18 illustrates two exemplary GUI that allow users to create and manage a Wish List

DETAILED DESCRIPTION

The present disclosure relates to methods and apparatus where information relating to products and services offered by various vendors may be offered for sale to customers via computing devices owned or used by those customers. Products and services offered to a particular customer may be related to a product previously purchased by that customer or be related to a product that a customer has access to. In certain instances, a product that a customer has access to may include a tag, such as a circuit, a chip, or printed matter which may be affixed, embedded or printed that may provide information to an electronic device of a customer. After the customer's device receives the information provided by the product tag, information on other products or services related to the tagged product may be received by the customer device. Methods consistent with the present disclosure may allow a user of a user device to interact with various different graphical user interfaces when making purchases.

Figure 1:
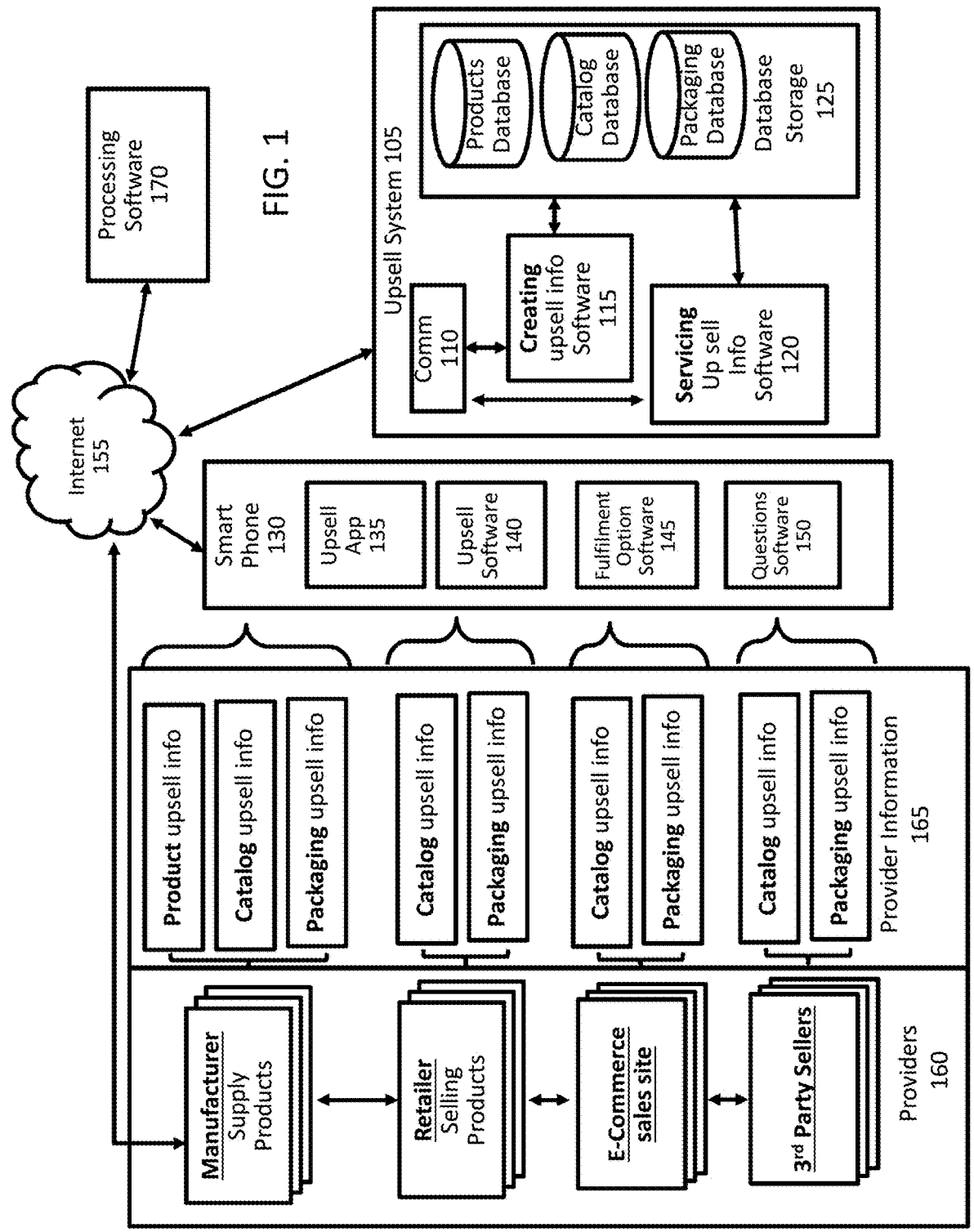
FIG. 1 illustrates an exemplary environment where an upsell system may provide information and services to a user operating a user device.

FIG. 1 illustrates an exemplary environment where an upsell system may provide information and services to a user operating a user device. FIG. 1 includes upsell system 105 that may communicate with user devices, such as smart phone 130, and with service providers 160 via the Internet 155.

The internet is the set of interconnected computers that communicate via the internet protocol suite: TCP/IP or current technology.

Upsell system 105 includes communication interface (COMM) 110, creating upsell information software 115, servicing upsell information software 120, and database storage 125. Note that database storage 125 may include a product database that stores product information, a catalog database that stores information relating to products or services that a customer may purchase, and a packaging database that stores information that identifies product packaging options.

A catalog is document (digital, print or otherwise expressed) that contains and inventory of products and services that is available to potential customers to aid in the purchase of a product or service.

A database is structured set of data stored in a computer or computer system that is accessible by other computers and computer systems to retrieve data.

Providers 160 illustrated in FIG. 1 include manufacturers that supply products, retailers that sell products, an e-commerce sales site that sell product online, and third ($3^{rd}$) party sellers. Each of the providers 160 of FIG. 1 may organize various sets of provider information 165 that may be accessed when upsell system 105 organizes the delivery of upsell offerings to a user of smart phone 130. Provider information 165 may include offerings that may be accessible by user devices (user device may be a tablet, a personal data assistant (PDA, personal computer, etc.) like smart phone 130 via upsell system 105.

A manufacturer is a person or company that produces products, goods, material or a combination thereof by hand or machinery. A retailer is a seller of products and materials. E-Commerce is the conduct of trade (buying and selling) via the internet. $3^{rd}$ party sellers are sellers of products who may or may not have a formal arrangement with the manufacturer of the product, retailer and/or the customer to sell similar or complimentary products and/or services.

A smart phone is a mobile wireless telephone that transmits audio, video and data and incorporates a computer operating system that allows for the execution of software and communication with people and other computers.

FIG. 1 illustrates that smart phone 130 includes an upsell application 135 software program interface, an upsell software program module, a fulfillment option software module 145, and a questions software module 150.

In certain instances, providers 160 may provide provider information 165 to upsell system 105 via the internet 155 when upsell offerings are created and stored in database storage 125 at upsell system 105. Upsell offerings include offerings of products and services offered for sale by providers 160, where those offerings may be related to one or more products that a customer has previously purchased.

When providers 160 create upsell information, providers 160 may access the creating upsell information software 115 module via communication interface 110, where the creating upsell information software 115 may store those newly created offerings in database storage 125.

Once upsell offerings have been created and stored in database storage 125 at upsell system 105, those offerings may be provided to smart phone 130 via the servicing upsell information software 120 module at upsell system 105. The servicing upsell information software module may then provide offering information to smartphone via communication interface 110 and internet 155. The upsell information received by smart phone 130 may be accessed by a customer using upsell application 135 and upsell software 140 at smart phone 130. In certain instances, upsell application 135 may be downloaded to smart phone 130 from upsell system 105. Upsell application 135 may include or be linked to various different upsell offerings currently offered by providers 160.

When a customer is interested in an upsell offering provided by one or more providers 160, that customer may communicate with one or more providers 160 when purchasing an offering. As such, a user device, such as smart phone 130 of the customer may not have to communicate with upsell system 105 when the customer makes an upsell purchase. Alternatively, or additionally, however, upsell system 105 may be involved in communications between smart phone 130 and provider 160 offerings when a customer makes purchases. When smart phone 130 is used to make purchases, the customer making the purchase may compose and send questions and receive answers regarding provider offerings using questions software 150 at smart phone 130. After a customer makes a purchase using upsell software 140, that customer may select options regarding fulfilling that purchase using fulfillment option software 145. Fulfillment option software 145 may also be used to provide the customer with information relating to the status of the shipment of their offering. As such, fulfillment option software 145 may allow a customer to select how their purchase should be fulfilled and be used to track their purchase when it is being prepared and shipped.

The Upsell System diagram includes providers [(1) Manufacturer Supply Products, (2) Retailer Selling Products and (3) E-Commerce sales site] that interacts through the internet to the Upsell System that has communications (COMM) that allows connection to the creation of the upsell info, that software storing that data in product, catalog or packaging databases. The providers ultimately get their respective upsell info on either of the actual product, the catalog with the products(s) or on the packaging and it gets provided to the customer from their interactions with the providers, the customers have a smartphone loaded with the Upsell App and its Upsell Software. When the customer uses the Upsell App they will connect to the Upsell System to find their related upsell info in the databases using the servicing upsell software and then the transaction gets completed by the Processing Software 170 (U.S. Pat. Nos. 8,125,667 and 8,970,864). The $3^{rd}$ Party Sellers are vendors that can sell products through the system when the providers refer them as well as upselling their own items.

An APP is a software application designed to be run on a mobile computing device that can accept user input, interact with external computers and electronic devices and the internet.

Fulfillment is the receiving an order, processing and order and the delivery of the ordered product or service to the customer.

Mobile computing devices can include smartphones, wearable computers, implanted devices or other portable hardware capable of storing and operating software instruction to execute user commands and communicate with other computer devices via network or other connections.

Figure 2:
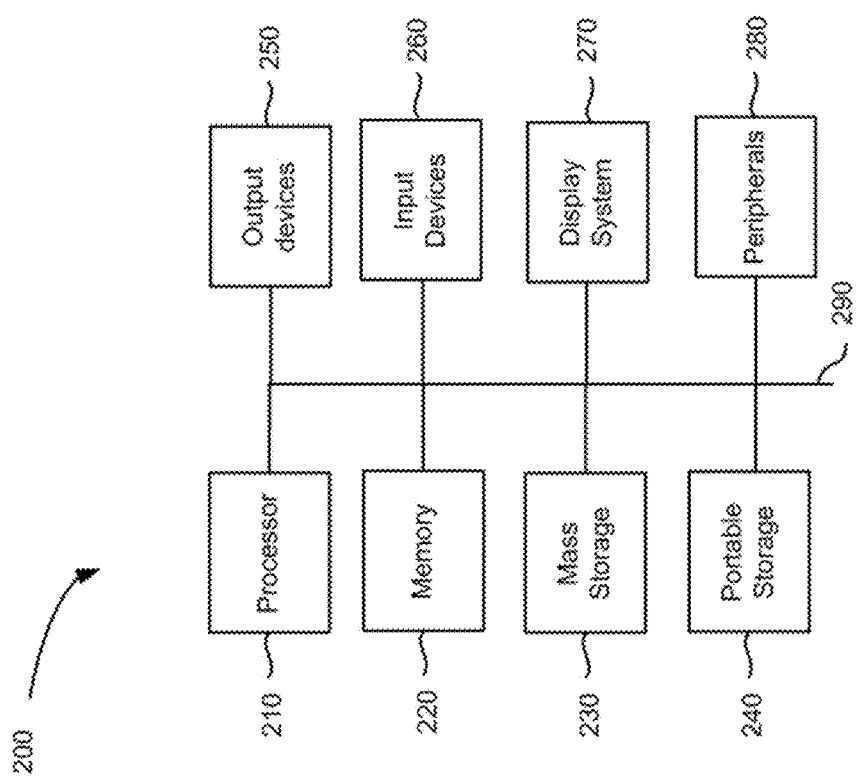
FIG. 2 is a block diagram of an exemplary system for implementing a computing device.

FIG. 2 is a block diagram of an exemplary system for implementing a computing device. The computing system 200 of FIG. 2 includes one or more processors 210 and memory 220. Main memory 210 stores, in part, instructions and data for execution by processor 210. Main memory 220 can store the executable code when in operation. The system 200 of FIG. 2 further includes a mass storage device 230, portable storage medium drive(s) 240, output devices 250, user input devices 260, a graphics display 270, and peripheral devices 280.

The components shown in FIG. 2 are depicted as being connected via a single bus 290. However, the components may be connected through one or more data transport means. For example, processor unit 210 and main memory 220 may be connected via a local microprocessor bus, and the mass storage device 230, peripheral device(s) 280, portable storage device 240, and display system 270 may be connected via one or more input/output (I/O) buses.

Mass storage device 230, which may be implemented with a magnetic disk drive or an optical disk drive, is a non-volatile storage device for storing data and instructions for use by processor unit 210. Mass storage device 230 can store the system software for implementing embodiments of the present invention for purposes of loading that software into main memory 220.

Portable storage device 240 operates in conjunction with a portable nonvolatile storage medium, such as a floppy disk, compact disk or Digital video disc, to input and output data and code to and from the computer system 200 of FIG. 2. The system software for implementing embodiments of the present invention may be stored on such a portable medium and input to the computer system 200 via the portable storage device 240.

Input devices 260 provide a portion of a user interface. Input devices 260 may include an alpha-numeric keypad, such as a keyboard, for inputting alpha-numeric and other information, or a pointing device, such as a mouse, a trackball, stylus, or cursor direction keys. Additionally, the system 200 as shown in FIG. 2 includes output devices 250. Examples of suitable output devices include speakers, printers, network interfaces, and monitors.

Display system 270 may include a liquid crystal display (LCD) or other suitable display device. Display system 270 receives textual and graphical information, and processes the information for output to the display device.

Peripherals 280 may include any type of computer support device to add additional functionality to the computer system. For example, peripheral device(s) 280 may include a modem or a router.

The components contained in the computer system 200 of FIG. 2 are those typically found in computer systems that may be suitable for use with embodiments of the present invention and are intended to represent a broad category of such computer components that are well known in the art. Thus, the computer system 200 of FIG. 2 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, iOS, Android and other suitable operating systems.

Figure 3:
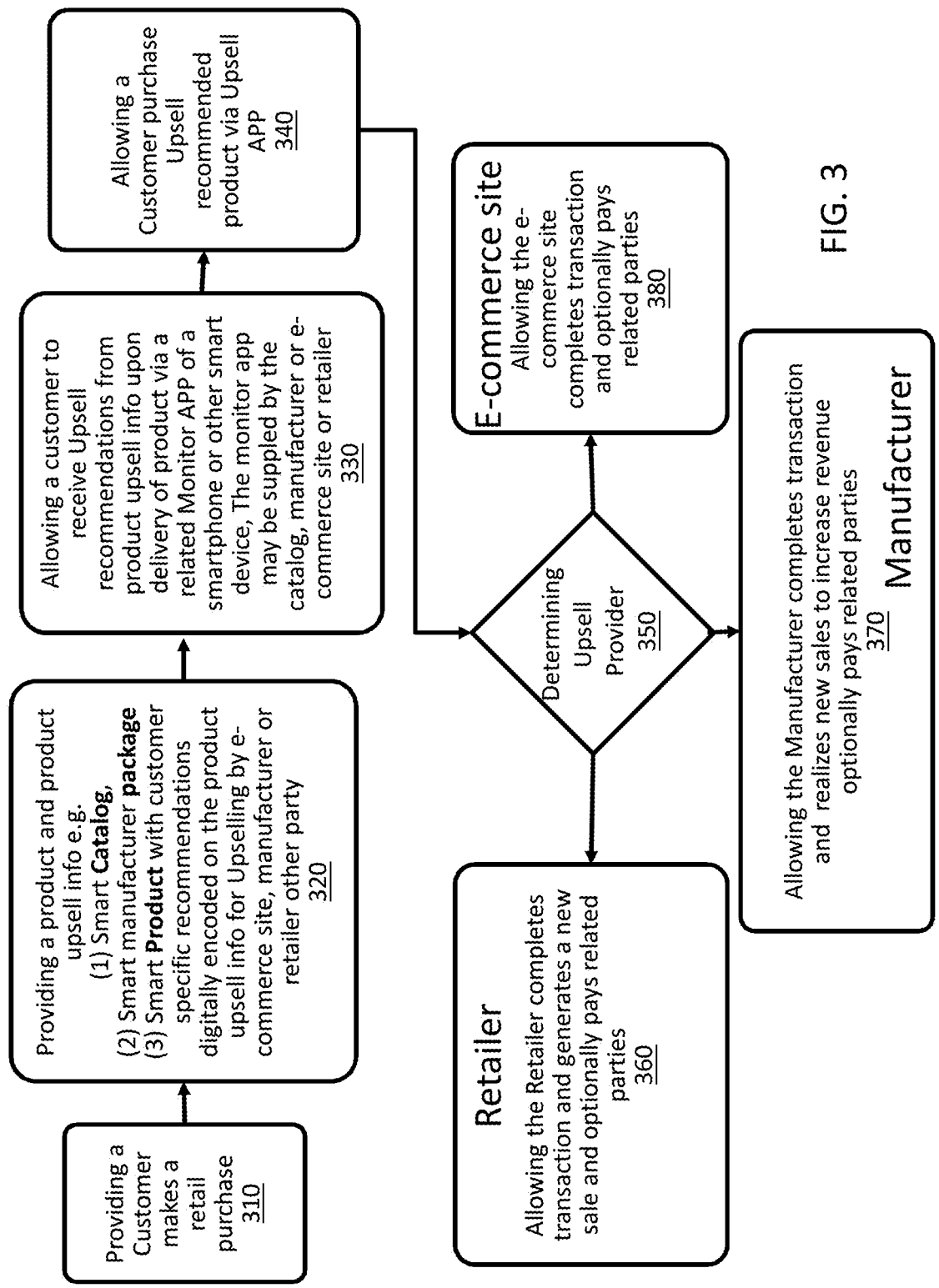
FIG. 3 illustrates an exemplary set of steps that may be performed when upsell opportunities are organized for transmission to a user device.

FIG. 3 illustrates an exemplary set of steps that may be performed when upsell opportunities are organized for transmission to a user device. In step 310 of FIG. 3 a customer operating a user device is provided with the ability to make a purchase. Next in step 320 of FIG. 3, information regarding a product and/or product upsell information may be provided to the user device. The information provided to the user device in step 320 may include a smart catalog, information regarding a smart manufacturer package, or may include specific recommendations regarding upsell offerings that may be provided by one or more providers (i.e. manufactures, retailers, $3^{rd}$ party vendors, and an e-commerce site). In certain instances, upsell offerings offered to a customer operating a user device may include information that is digitally encoded on the product.

Information encoded on a product may be encoded in various different means. In certain instances, a circuit or a wireless transceiver may be embedded in the product where a user device may wirelessly read information from the circuit or wireless transceiver. In such instances, the circuit or wireless transceiver embedded in the product may extract power from a wireless transmission from a user device that causes the circuit or wireless transceiver to transmit information to the user device wirelessly. Alternatively, or additionally, information encoded in a product may be visually encoded, where a user of a user device may take a picture of the visually encoded information that causes the user device to link to a WEB page that provides information to the user of the user device via a display at the user device.

After step 320, step 330 allows the customer to receive upsell recommendations via their user device. Those upsell recommendations may include information relating to the delivery of a product and may be provided via a software monitoring application program installed on the customer's user device. In certain instances, the software monitoring application program may be an application program (i.e. an "app") that is provided by a manufacturer, a retailer, a $3^{rd}$ party vendor, or an e-commerce site.

Next in step 340, the customer may be allowed to purchase a recommended upsell product offering via an upsell software application installed on their user device. After a user has decided to purchase an upsell offering in step 340, determination step 350 identifies an upsell provider that could best service a purchase order related to the customer's upsell purchase decision. Depending on which provider has been identified as being the best provider to service the upsell offering purchase order, that purchase order may be passed to a retailer, to a manufacturer, or to an e commerce site. Note that step 360 of FIG. 3 may relate to actions associated with the purchase order that may be performed at a retailer. Note that step 370 of FIG. 3 is associated with actions associated with the purchase order that may be performed at a manufacturer. Similarly, step 380 of FIG. 3 is associated with actions associated with the purchase order that may be performed at an e-commerce site. Actions relating to servicing an upsell purchase order may include completing transactions, paying related parties, and providing shipment information.

The method involves (1) providing a Customer makes a retail purchase and (2) providing a product which is delivered with product upsell info e.g. by a (1) Smart Catalog, (2) Smart Package and/or (3) Smart Product that has customer specific recommendations digitally encoded with product upsell info or a link to external information for Upselling by e-commerce site, manufacturer or retailer other party and (3) Allowing a customer to receive Upsell recommendations from product upsell info upon delivery of product via a related Upsell APP of a smartphone or other smart device, The monitor app is supplied by the catalog, manufacturer or e-commerce site or retailer and (4) allowing a customer to purchase Upsell recommended product via Monitor APP and (5) Determining Upsell provider and if a retailer, Allowing the Retailer completes transaction and generates a new sale and optionally pays related parties or if a manufacturer, Allowing a Manufacturer completes transaction and realizes a new sales to increase revenue optionally pays related parties, or if a e-commerce site Allowing the e-commerce site completes transaction and optionally pays related parties.

Figure 4:
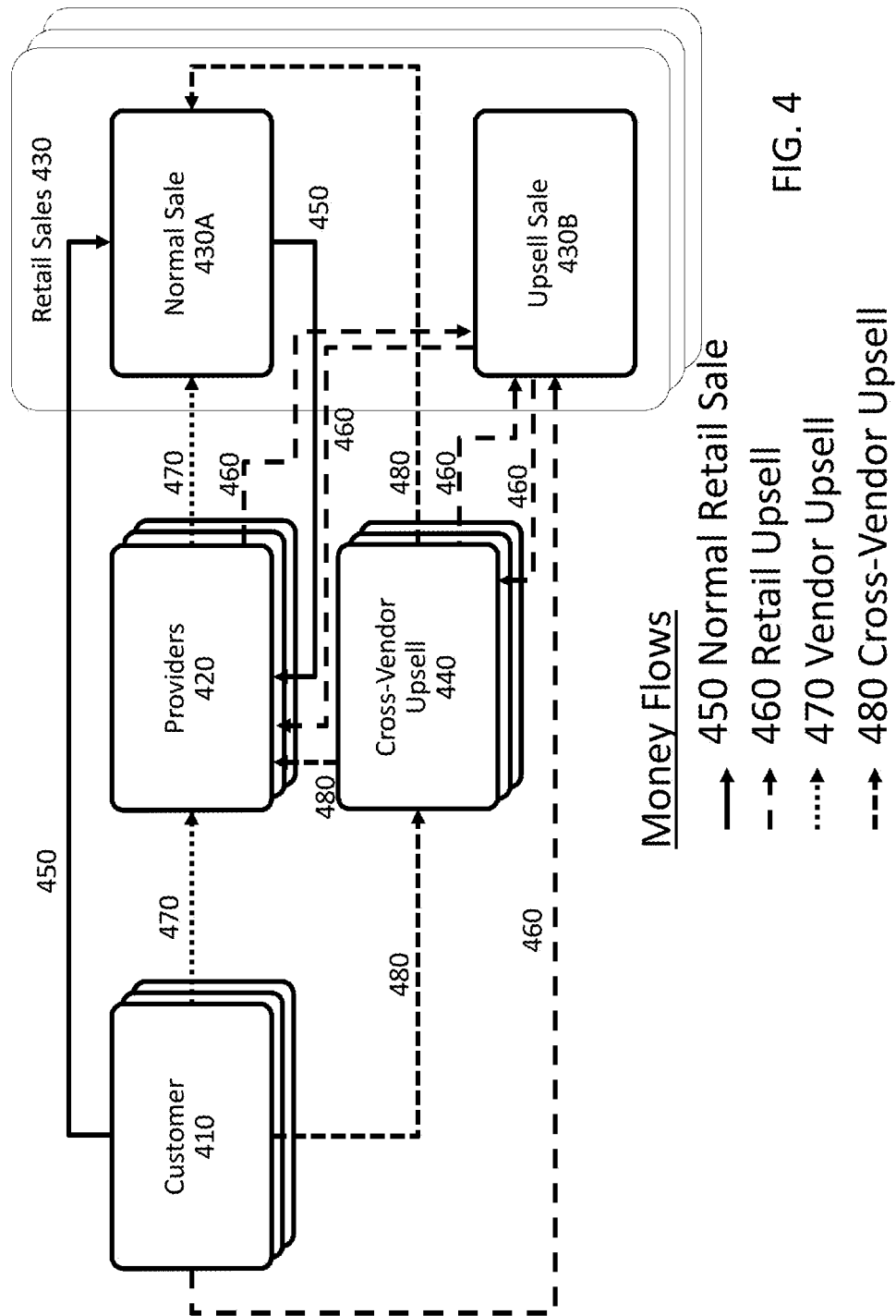
FIG. 4 illustrates various different types of flows of monies (or revenues) of different types that may be processed by systems and methods consistent with the present disclosure.

FIG. 4 illustrates various different types of flows of monies (or revenues) of different types that may be processed by systems and methods consistent with the present disclosure. FIG. 4 includes entities of customer 410, providers 420, retail sales 430, and cross vendor upsell sales 450 between which funds relating to purchases may be forwarded. Note that sales provided by retailers 430 (retail sales) include both normal sales 430A and upsell sales 430B.

Money flows illustrated in FIG. 4 include revenue flows related to normal retail money flows 450, retail upsell money flows 460, vendor upsell money flows 470, and cross-vendor upsell money flows 480. FIG. 4 thus, illustrates that revenues may flow between customer 410 and a retail sales establishment 430 when normal sales 430A and upsell sales when customer 420 buys products or services from retailer 430.

FIG. 4 also illustrates that revenue may flow between other providers 420 and with cross-vendor upsell 440 entities, where providers 420 and cross-vendor upsell 440 entities may transfer monies between the retailer 430 that performs upsell sales 430B and a retailer 430 that performs normal sales 430A. Because of this providers 420 and cross-vendor upsell entities 440 may allow other entities, such as retailer 430 to receive revenue when retailer 430 sells products or services related to a sale made by provider 420 or by cross-vendor upsell entity 440 or visa-versa.

This method shows the flow of funds between the customers and the providers for a normal sale and an upsell sale when cross vendors are used in the upsell.

Figure 5:
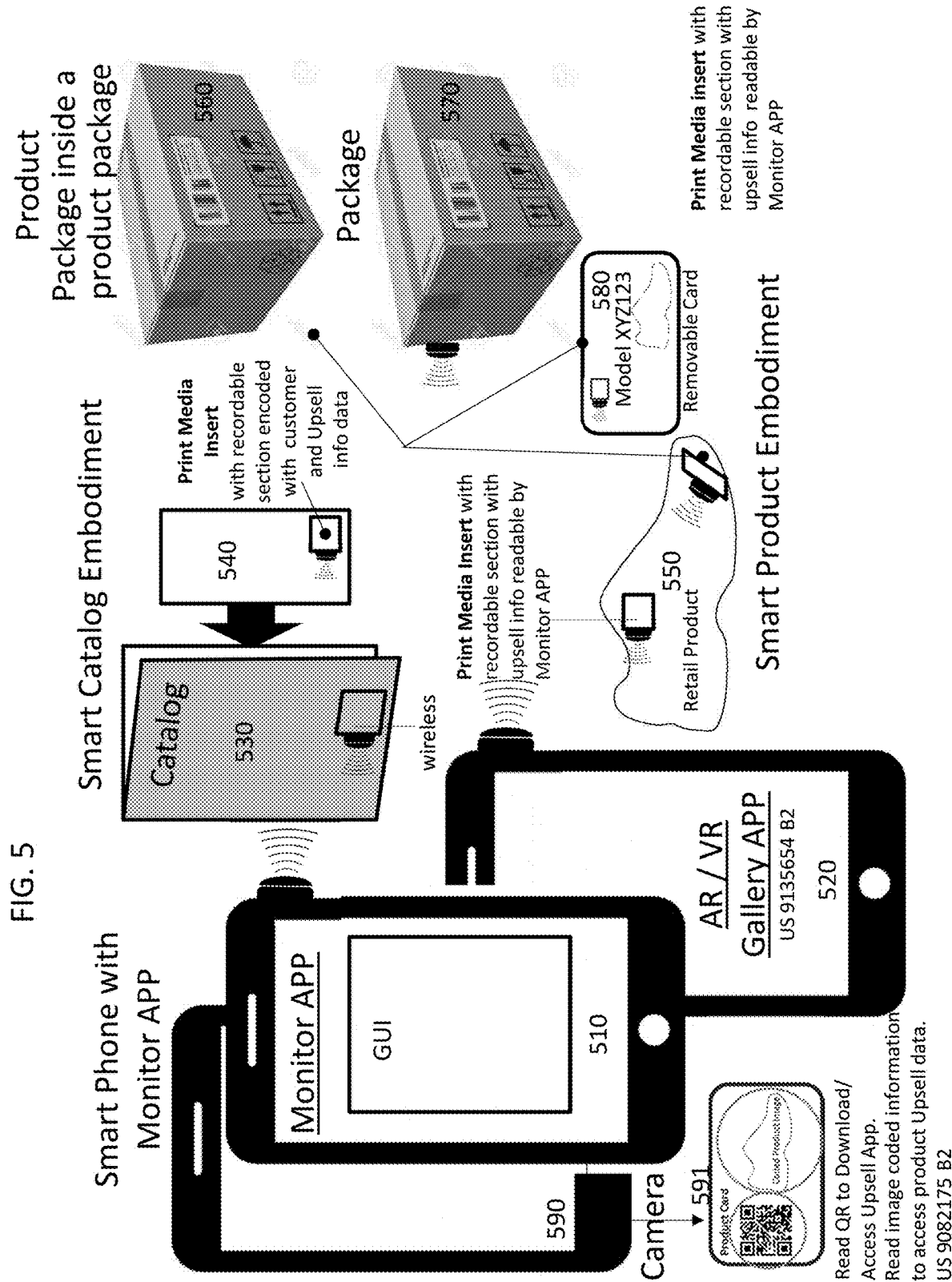
FIG. 5 illustrates user devices that may receive information regarding products, catalogs, or packaging options that may be associated with a product.

FIG. 5 illustrates user devices that may receive information regarding products, catalogs, or packaging options that may be associated with a product. FIG. 5 includes user devices 510, 520 and 590. Catalog 530, insert 540, retail product 550, product in a package 560, package 570, and removable card 580 of FIG. 5 each include one or more wireless transmitter tags and card 591 includes encoded visual data.

Catalog 530 is a bound container or physically printed document that includes a tag encoded with product information and Insert 540 is a flyer or other printed media with an encoded tag.

A package is container that encloses an object and/or product. Packaging options are choices provided to a customer related to the type of packaging to be used when shipping the product that was ordered.

In certain instances, user devices 510 and 520 may receive information wirelessly transmitted from catalog 530, insert 540, retail product 550, product in a package 560, package 570, and removable card 580. The information received by user device 510 may be displayed on a graphical user interface (GUI) via an application monitoring program at user device 510.

A GUI on an electronic device consists of an interface that allows users to interact with it through graphical icons and visual indicators; not just text, typed commands or other text navigation. The GUI interface allows direct manipulation of graphical elements that may be combined with text. GUI can be used on a computer, handheld devices such as portable media players, gaming devices, smartphones and household, office and applications.

Additionally or alternatively the information received by user device 520 may be received by application programs that are installed on user device 520 where those programs may use that information when performing functions consistent with the present disclosure. Note that catalog 530, insert 540, retail product 550, product in a package 560, package 570, and removable card 580 of FIG. 5 each include one or more wireless transmitters. These wireless transmitters may be connected to or be contained within catalog 530, insert 540, retail product 550, product in a package 560, or package 570. Wireless transmission technologies associated with the present disclosure may include any type of wireless transmission capability known in the art, including, yet not limited to radio frequency identifiers (RFID), Bluetooth™, near field data communications (NFC), iBeacon, CCD, MEMS, or other wireless transmission technique. Because of this, user devices 510 and 520 may receive information related to an upsell opportunity that may also be included in or associated with a print media entry or device associated with a catalog 530, an insert 540, a retail product 550, a product in a package 560, or a package 570.

In an example, user devices 510 may receive information from a transmitter connected to product 550 that is a shoe. Upsell software operating on user device 510 may use the information received from shoe 550 to identify an upsell opportunity for shoe polish, where information relating to the shoe polish may be displayed in the GUI of user device 510. If the user decides to purchase the shoe polish, the user may make a selection in the GUI and user device 510 may then receive information relating to how the shoe polish will be paid for and how the user would like to receive the shoe polish. As such, the user could pay for the shoe polish with a credit card and could order that the shoe polish be sent to an address using next day delivery express mail.

Figure 6:
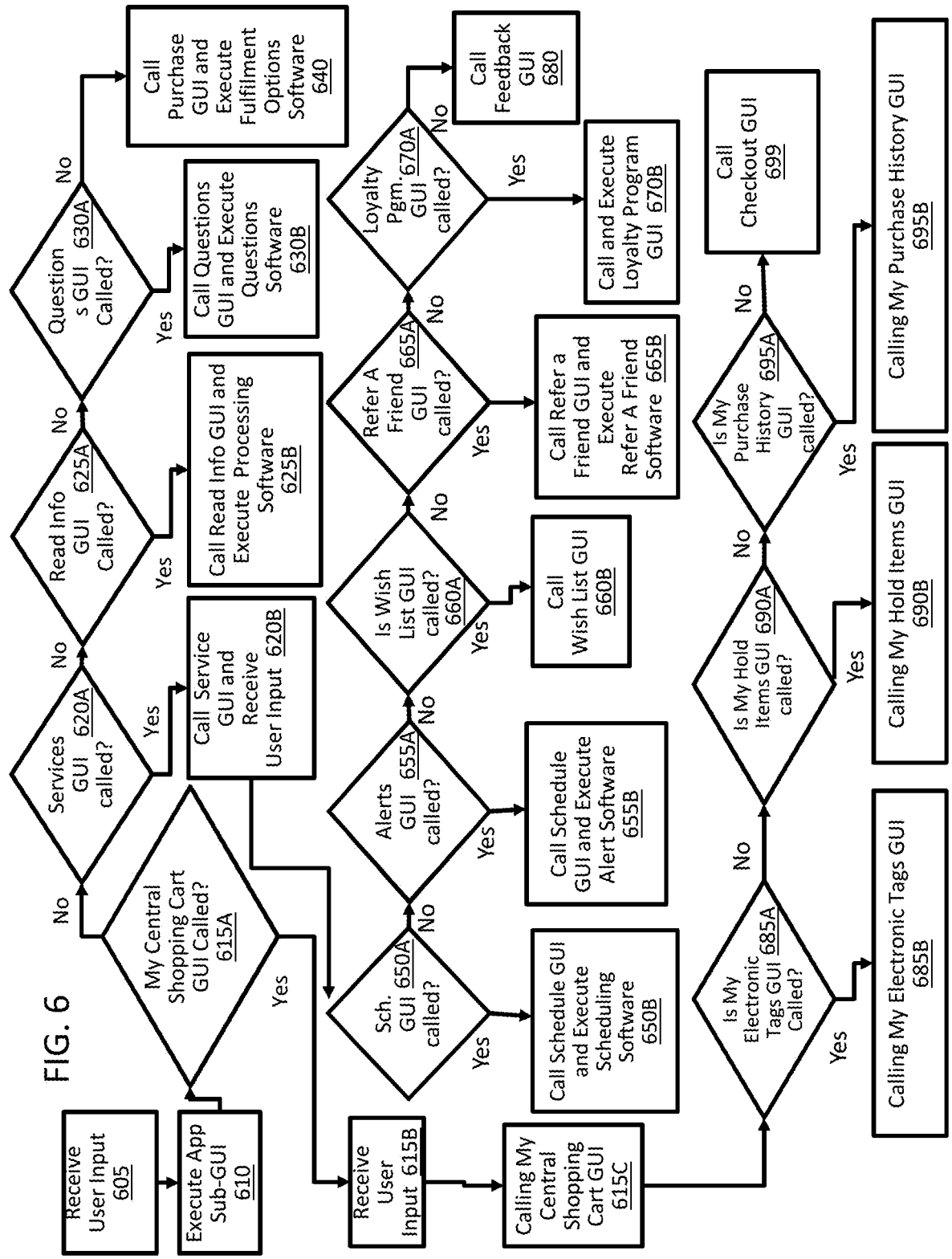
FIG. 6 illustrates a series of steps that may be performed by upsell software consistent with the present disclosure.

FIG. 6 illustrates a series of steps that may be performed by upsell software consistent with the present disclosure. Step 605 of FIG. 6 may receive user input information. After step 605, step 610 may open a graphical user interface (GUI) that may allow a user of a user device to select a type of sub-GUI. Next a series of determination steps (615A 620A, 625A, and 630A) may be used to identify what type of sub-GUI has been selected by a user of the user device. Note that step 615A relates to opening a shopping cart GUI, that step 620A relates to opening a services GUI, that step 625A relates to opening an information GUI, and that step 630A relates to opening a question GUI. When each of determination steps 615A 620A, 625A, and 630A identify that a GUI has not been selected, program flow moves to step 640 where a purchase GUI may be opened and where a purchase may be performed, executed, and fulfilled.

When step 615A identifies that the user wishes to open a shopping cart, program flow may move to step 615B where additional user input may be received. Next program flow may move to step 615C that calls the shopping cart GUI for information that performs different determination steps 685A, 690A, and 695A may identify whether a function associated with the shopping cart should be performed. When each of determination steps 685A, 690A, and 695A identify that a GUI has not been selected by a user, step 699 of FIG. 6 may call a check out GUI, where a user may complete a purchase.

When determination step 685A identifies that additional user input received in step 615B relates to a GUI associated with an electronic tag, program flow may move to step 685B where the electronic tag GUI is called. When determination step 690A identifies that additional user input received in step 615B relates to a GUI associated with a product "hold my items request," program flow may move to step 690B where a "hold my items GUI" is called. When determination step 695A identifies that additional user input received in step 615B relates to a GUI associated with a purchase history, program flow may move to step 695B where a purchase history GUI is called.

When step 620A identifies that a services GUI has been selected by a user, program flow may move to step 620B that calls the services GUI and that receives user input. After step 620A are a series of determination steps (650A, 655A, 660A, 665A, and 670A) that may identify whether the user has selected a schedule GUI, an alerts GUI, a wish list GUI, a friend GUI, or a loyalty program GUI in any of steps 650A, 655A, 660A, 665A, and 670A. When the user has not selected any GUI associated with steps 650A, 655A, 660A, 665A, and 670A, program flow moves to step 680 where a callback GUI is called.

A loyalty program is a rewards program offered by product and service providers that provides special offers, discounts, access, etc. to frequent or high dollar volume customers.

When step 650A identifies that the user wishes to open a schedule GUI, program flow may move to step 650B where the schedule GUI may be called and software relating to scheduling a purchase may be executed. When step 655A identifies that the user wishes to open an alerts GUI, program flow may move to step 655B where the alerts GUI may be called and software relating to an alert may be executed.

When determination step 660A identifies that the user wishes to open a wish list GUI, program flow may move to step 660B where the wish GUI may be called and where software relating to products that the user would like to acquire may be executed. When step 665A identifies that the user wishes to open a "refer a friend GUI," program flow may move to step 665B where the "refer a friend GUI" may be called and where software relating to a friend referral may be executed. When step 670A identifies that the user wishes to open a loyalty program GUI, program flow may move to step 670B where the loyalty program GUI may be called and where software relating to scheduling the loyalty program may be executed.

FIG. 6 illustrates that a processor executing instructions out of a memory at an upsell system may receive user input that allows a user to open different types of GUIs when entering information relating to purchases, upsell purchases, products, and/or services that a user may like to buy using a user device that may be communicatively coupled to an upsell system consistent with the present disclosure.

The Upsell software receives data from the Upsell APP GUI as input by the customer. Based on this input the software presents the customer with the appropriate GUI and/or executes the appropriate software to satisfy the customer request.

Figure 7:
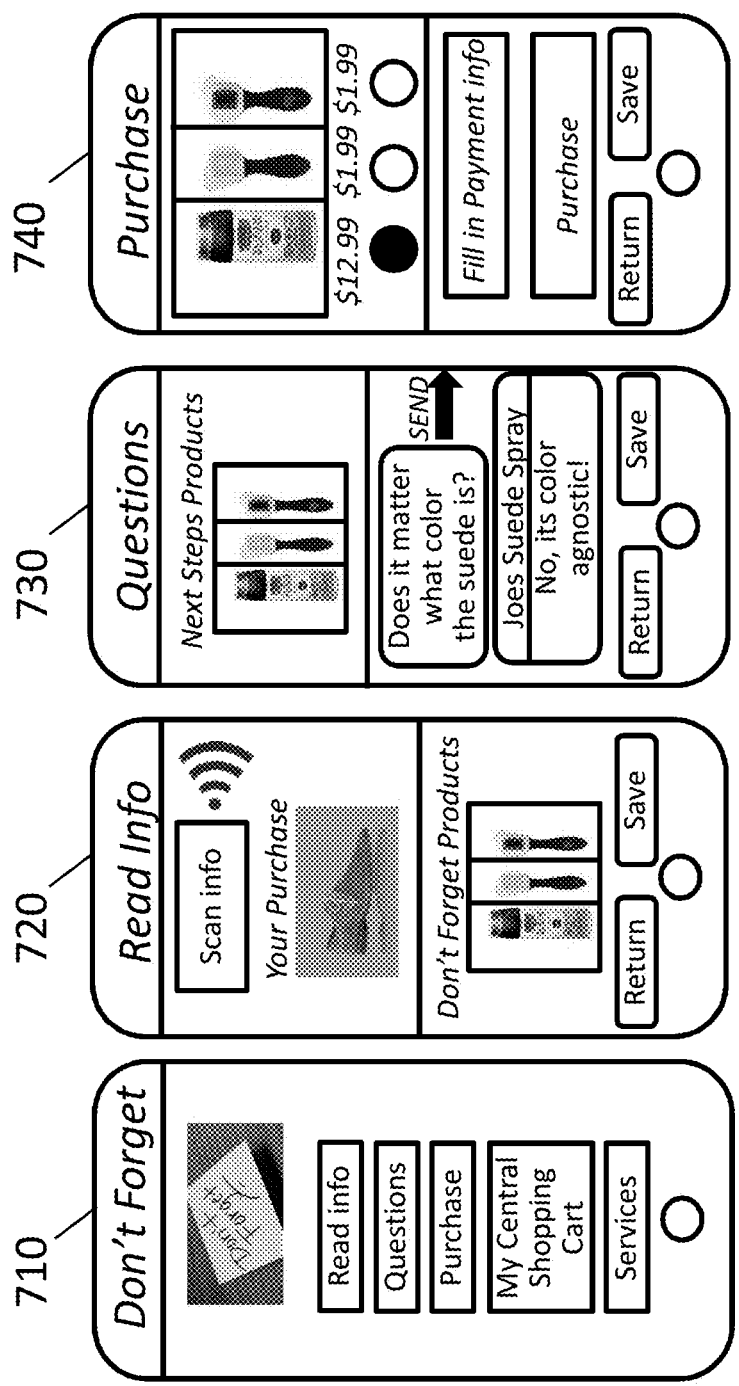
FIG. 7 illustrates exemplary content that may be displayed on user devices when a user of a user device makes a purchase.

FIG. 7 illustrates exemplary content that may be displayed on user devices when a user of a user device makes a purchase. FIG. 7 includes user interface 710 that displays information relating to a "don't forget" reminder and user interface 720 that displays information that may read relating to a purchasing and ordering products. User interface 730 includes information relating to questions that a customer may have regarding a purchase. Finally user interface 740 includes information relating to an item selected for purchase. Note that the don't forget user interface 710 includes selection boxes that may be used to open the read info 710 user interface, the questions 730 user interface, or the purchase 740 user interface. Note also that each respective user interface includes various different selection boxes that may be selected to make a purchase, change items that are purchased, display content of a shopping cart, return to a previously user interface selection, or to save information included in a user interface.

The Upsell App GUI which is branded as "Don't Forget". Upon entering the App (A) customer has the choice of reading information on the upsell info tag on the product, the catalog or the packaging, once read the customer has the ability to ask questions of the info provided or to actually purchase the upsell product. Once the customer initiates the "read Info" icon, the Read Info GUI B is initiated. The customer has the ability to scan the catalog, package or product (Scan Info icon). Once connected and scanned the wireless connection signal is shown. This initiates the provider to initiate the servicing upsell info software in the Upsell System. (Note that previously the Upsell system was used to create the upsell information on the product, catalog or packaging). Once the customer sees what was purchased the and upsell products are shown in the "Don't Forget Products." The customer can return or save the information. The customer may ask questions before purchase, by initiating the questions icon on GUI panel A. The questions GUI C is shown, where the customer can interact with the upsell product by sending and receiving information. The customer can return or save the information. If the customer decides to purchase the upsell product the initiate the purchase icon on GUI A which opens the Purchase GUI D. The consumer can see the prices, select the products to purchase and fill in payment info and purchase the items. When purchasing the products the provider is connected to and the providers then initiate the upsell system servicing The customer can return or save the information. Saved Upsell product selections (from a single or multiple vendors) can be saved in My Central Shopping Cart where pending purchases, history, etc. can be managed. Additional transaction details can be controlled through Actions to create schedules, alerts and wish lists.

Figure 8:
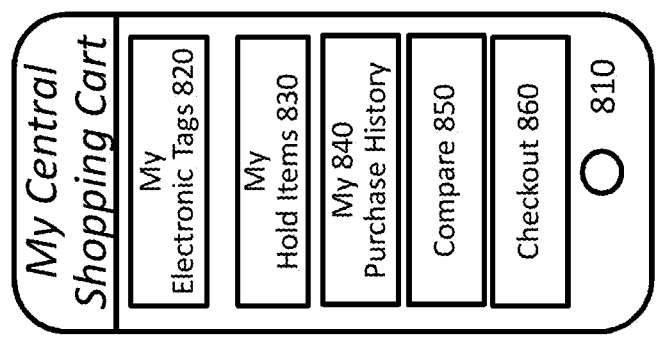
FIG. 8 illustrates an exemplary shopping cart graphical user interface (GUI) that may allow a user to select one of a number of selection boxes when that user wishes to manage options relating to making purchases.

FIG. 8 illustrates an exemplary shopping cart graphical user interface (GUI) that may allow a user to select one of a number of selection boxes when that user wishes to manage options relating to making purchases. The shopping cart GUI 810 of FIG. 8 includes "a my electronic tags" 820 selection box, "a my hold items" 830 selection box, "a my purchase history" selection box 840, "a compare selection" box 850, and "a checkout" 860 selection box. When one of the selection boxes of FIG. 8 are selected, a sub-GUI associated with that selection may be opened that allows the user of a user device to view and or set items relating to products that a user has access to or that relate to items that a user wishes to purchase.

The My Central Shopping Cart GUI provides a central location to manage Upsell items. The customer can review all of the electronic tags identified by the Upsell system by selecting My Electronic Tags (electronic tags can be NFC, RFID, IBEACON, CCD, MEMS or other electronic information interaction technology). This provides the customer with the opportunity to purchase or re-purchase any Upsell item that has ever been offered by all vendors, merchants, retailers, manufactures, etc. The customer reviews selected items that are pending purchase from various upsell offers in My Hold Item. Similarly, the history of purchased Upsell items is available in My Purchase history and made available for re-purchase. Items that are selected in My Hold Item can be purchased in a single transaction (even if items are from various vendors) via Proceed to Check Out.

Note that "my Central shopping cart" is in-essence a shopping cart of all shopping carts, that is, all shopping carts of all vendors are in one shopping cart. Given we have a shopping cart of sold items for an upsell from many vendors shopping cart, our shopping cart has, in essence information from other shopping carts The compare button allows the user to compare the costs of the upsell item is the best possible price against the prices available from other vendors.

NFC is near field communication technology, a communication protocol that allows two electronic devices to communicate wirelessly at close range. An NFC tag is and electronically enabled tag containing information or instructions related to and associated object. RFID is radio frequency identification technology that the energy from the radio waves emitted by a reader to access electronic information stored in electronic circuitry on a tag, key or other object. iBeacon is a proprietary electronic beacon system developed by Apple, based on Bluetooth Low Energy wireless computer networking technology. CCD is a charge coupled device that is used in cameras to capture light and generate images. MEMS are microelectromechanical systems that comprise of microscopic mechanical parts and can be used to create sensors, displays, switches, and other devices.

Figure 9:
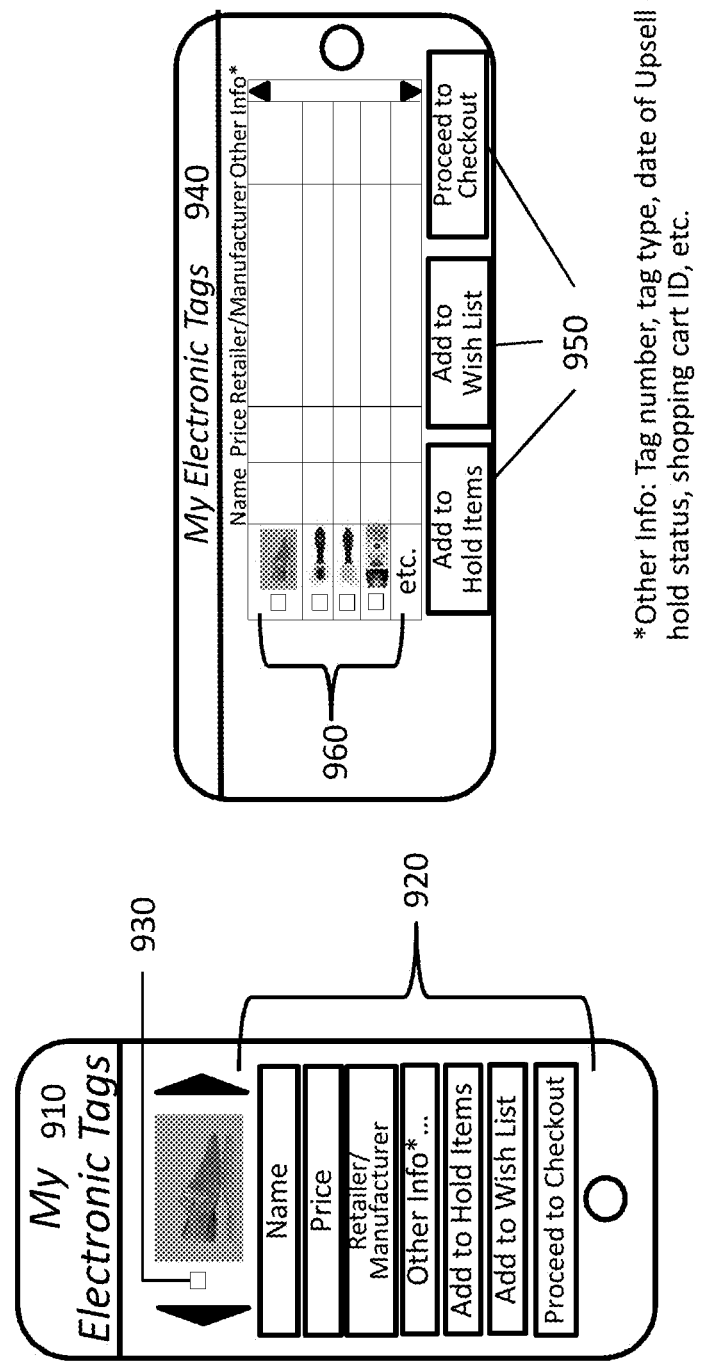
FIG. 9 illustrates exemplary GUIs that may be used by a user to display and enter information relating to electronic tags may be associated with a product.

FIG. 9 illustrates exemplary GUIs that may be used by a user to display and enter information relating to electronic tags may be associated with a product. FIG. 9 includes my electronic tag GUI 910 and my electronic tag GUI 940 that display similar information in different formats. Note that electronic tag GUI 910 includes various boxes 920 that include a product name, a price, a retailer/manufacture, information, an "add to hold" selection box, an "add to wish list" selection box, and a proceed to checkout selection box. The boxes 920 of FIG. 9 may be boxes that may be selected by a user when that user wishes to review certain information in more detail or that may be used to add a particular product to an action list. In an instance where the name, price, or retailer/manufacture box is selected, information that relates to a product's name, a price relating to the product, or information relating to a retailer or manufacture associated with the product may be displayed after a user selects one of those selection boxes. Actions that may be executed when a selection box is selected may relate to adding a particular product to a hold list, adding a product to a wish list, or to moving to a checkout GUI depending on which box the user selects. Note also that tag GUI 910 also includes checkbox 930 that may be selected by a user. In certain instances, checkbox 930 may have to be checked for one of the boxes 920 to be populated with a name, a price, or a retailer/manufacturer, for example. In certain other instances, checkbox 930 may have to be selected for action boxes of "add to hold items" or "add to wish list" selection boxes to be enabled to add a selected product to a hold list or to add that selected product to a wish list.

Note that tag GUI 940 of FIG. 9 includes selection boxes 950 and checkboxes 960. Here again items that have been selected via checkboxes 960 may be entered to a hold list when the "add to hold items" or may be added to a wish list when the "add to wish list" selection box is selected. Furthermore, when the "proceed to checkout" selection box is selected, a checkout GUI may be opened at a user device of a user. Note that tag GUI 940 includes a table that includes rows information relating to various products. Various columns in the table of tag GUI 940 include a product name, a price, a retailer/manufacture, and other information. Like the selection boxes 910 of tag GUI 910, entries in a particular column and row may be selected with a user wishes to see additional information relating to a product. For example, a user selecting the retailer/manufacture of the shoe illustrated in tag GUI 940 may be presented with a GUI that displays extended information regarding a retailer or a manufacture. In such instances, for example, a manufacture's name and place of manufacture may be displayed in a GUI based on a user making one or more selections in a table.

Tagged products that appear in the tag GUIs 910 and 940 may have been identified via a wireless transmission from an electronic tag built into a product. Alternatively or additionally, product tags that include printed information may be photographed by a camera at a user device. Because of this, products that appear in tag GUIs 910 and 940 may be received via an electronic transmission or that may be identified electronically via software at the user device that identifies data included in a print media tag.

Note that other information that may be included in tag GUIs 910 and 940 may include a tag number, a tag type, a date that a sale or an upsell occurred, a hold status, or a shopping cart identifier.

My Electronic Tags allows the customer to review all of the Upsell items offered to them from all vendors. The interface allows the customer to review products, purchase them directly and/or add them to the Hold Items database. Single or multiple items can be selected, across vendors, for purchase. Embodiment 1 allows for the user to swipe through detailed product information one-at-a-time. Embodiment 2 allows for a table-view of product information to allow for sorting and multiple selection of Upsell items.

Figure 10:
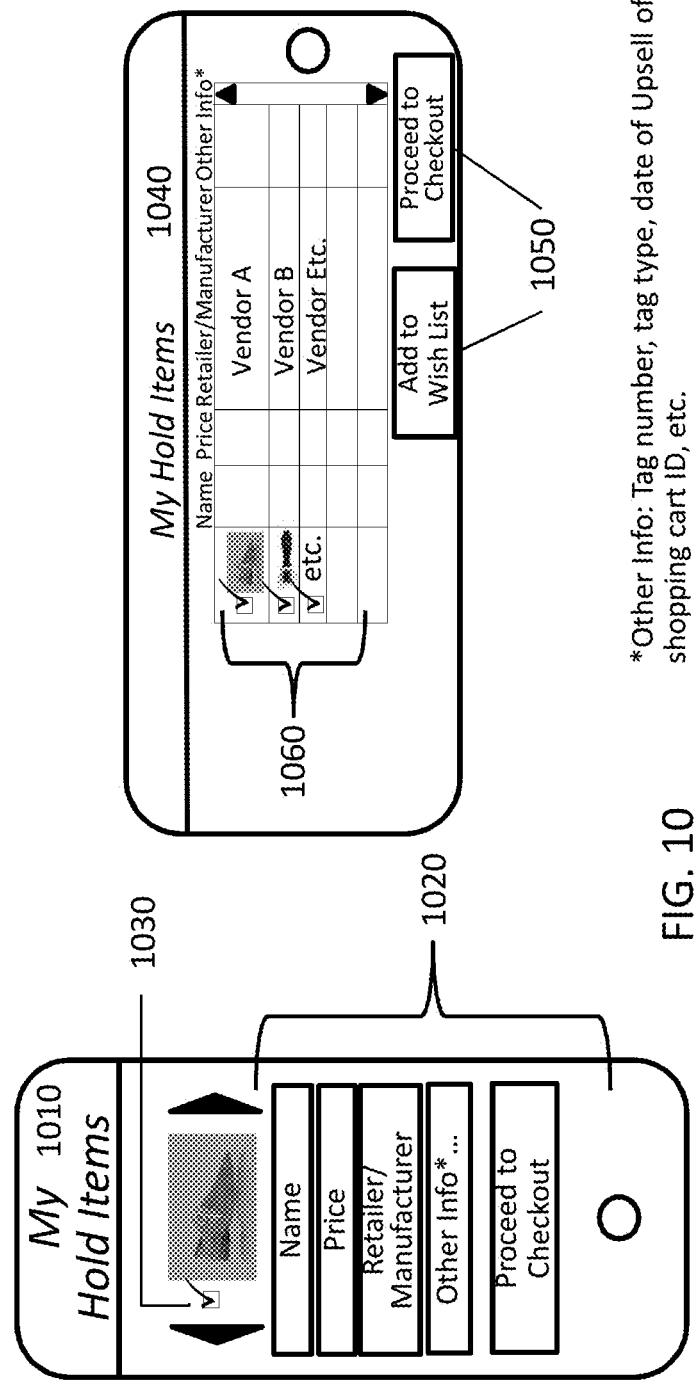
FIG. 10 illustrates exemplary GUIs that may be used by a user to display and enter information relating items that a user has in a hold list.

FIG. 10 illustrates exemplary GUIs that may be used by a user to display and enter information relating items that a user has in a hold list. FIG. 10 includes my hold items GUI 1010 and hold items GUI 1040 that display similar information in different formats. Note that hold items GUI 1010 includes various boxes 1020 that include a product name, a price, a retailer/manufacture, information, and a proceed to checkout selection box. The boxes 1020 of FIG. 10 may be boxes that can be selected by a user when that user wishes to review certain information in more. In an instance where the name, price, or retailer/manufacture box is selected, information that relates to a product's name, a price relating to the product, or information relating to a retailer or manufacture associated with the product may be displayed after a user selects one of those selection boxes. Actions that may be executed when a selection box is selected will depend on which box a user selects. For example, a checkout GUI may be displayed after a user selects "the proceed to checkout" selection box. Note also that hold items GUI 1010 also includes checkbox 1030 that may be selected by a user. In certain instances, checkbox 1030 may have to be checked for one of the boxes 1020 to be populated with information such as a name, a price, or a retailer/manufacturer, for example. In certain other instances, checkbox 1030 may have to be selected for that product to be added to a checkout list.

Note that tag GUI 1040 of FIG. 10 includes selection boxes 1050 and checkboxes 1060. Here again items that have been selected via checkboxes 1060 may be entered to a wish list when the "add to wish list" selection box is selected. Note that tag GUI 1040 includes a table that includes rows information relating to various products. Various columns in the table of hold items GUI 1040 include a product name, a price, a retailer/manufacture, and other information. Like the selection boxes 1010 of hold items GUI 1010, entries in a particular column and row may be selected with a user wishes to see additional information relating to a product. For example a user selecting the retailer/manufacture of the shoe illustrated in hold items GUI 1040 may be presented with a GUI that displays extended information regarding a retailer or a manufacture. In such instances, for example, a manufacture's name and place of manufacture may be displayed in a GUI based on a user making one or more selections in a table.

Products that appear in the GUIs 1010 and 1040 may have been identified via a wireless transmission from an electronic tag built into a product. Alternatively or additionally, product tags that include printed information may be photographed by a camera at a user device. Because of this, products that appear in GUIs 1010 and 1040 may be received via an electronic transmission or may be identified electronically via software at the user device that identifies data included in a print media tag.

Note that other information that may be included in GUIs 1010 and 1040 may include a tag number, a tag type, a date that a sale or an upsell occurred, a hold status, or a shopping cart identifier.

My Hold Items allows the customer to review all of the Upsell items they intend to buy from all vendors. The interface allows the customer to review all products to be purchased in a single interface. Embodiment 1 allows for the user to swipe through detailed product information one-at-a-time. Embodiment 2 allows for a table-view of product information to allow for sorting and filtering of products based on criteria such as vendor, shopping cart ID or other convenient ways to review a pending purchase.

Figure 11:
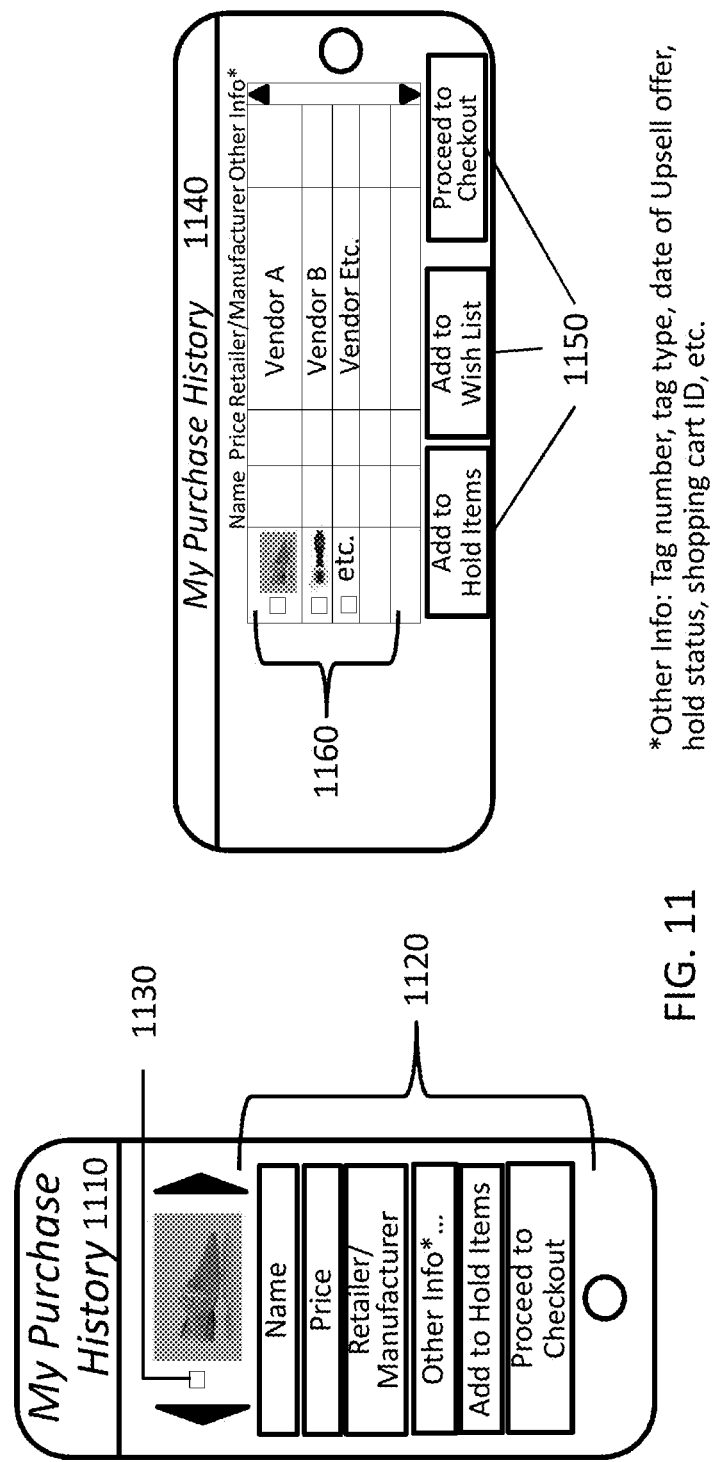
FIG. 11 illustrates exemplary GUIs that may be used by a user to display information relating to a customer's purchased history may be associated with a product

FIG. 11 illustrates exemplary GUIs that may be used by a user to display information relating to a customer's purchased history may be associated with a product. FIG. 11 includes purchase history GUI 1110 and purchase history GUI 1140 that display similar information in different formats. Note that purchase history GUI 1110 includes various boxes 1120 that include a product name, a price, a retailer/manufacture, information, an "add to hold" selection box, and a proceed to checkout selection box. The boxes 1020 of FIG. 11 may be boxes that may be selected by a user when that user wishes to review certain information in more detail or that may be used to add a particular product to an action list. In an instance where the name, price, or retailer/manufacture box is selected, information that relates to a product's name, a price relating to the product, or information relating to a retailer or manufacture associated with the product may be displayed after a user selects one of those selection boxes. Actions that may be executed when a selection box is selected may relate to adding a particular product to a hold list, adding a product to a wish list, or to moving to a checkout GUI depending on which box the user selects. Note also that tag GUI 1110 also includes checkbox 1130 that may be selected by a user. In certain instances, checkbox 1130 may have to be checked for one of the boxes 1120 to be populated. In certain other instances, checkbox 1130 may have to be selected for an action to occur.

Note that purchase history GUI 1140 of FIG. 11 includes selection boxes 1150 and checkboxes 1160. Here again items that have been selected via checkboxes 1160 may be entered to a hold list when the "add to hold items" selection box is selected, a checkout GUI may be opened at a user device of a user. Note that purchase history GUI 1140 includes a table that includes rows information relating to various products. Various columns in the table of purchase history GUI 1140 include a product name, a price, a retailer/manufacture (vendor), and other information. Like the selection boxes 1110 of purchase history GUI 1110, entries in a particular column and row may be selected with a user wishes to see additional information relating to a product. Note that purchase history GUI 1104 includes an "add to hold items" selection box, a "add to wish list" selection box, and a "proceed to checkout" selection box.

Note that other information that may be included in purchase history GUIs 1110 and 1140 may include a tag number, a tag type, a date that a sale or an upsell occurred, a hold status, or a shopping cart identifier.

My Purchase History allows the customer to review all of the Upsell items they have purchased from all vendors. The interface allows the customer to review all products to be purchased in a single interface. Embodiment 1 allows for the user to swipe through detailed product information one-at-a-time. Embodiment 2 allows for a table-view of product information to allow for sorting and filtering of products based on criteria such as vendor, shopping cart ID or other convenient ways to review a pending purchase. Items that the customer wishes to purchase again can be purchased directly or tagged as and added to My Hold Items for later purchase.

Figure 12:
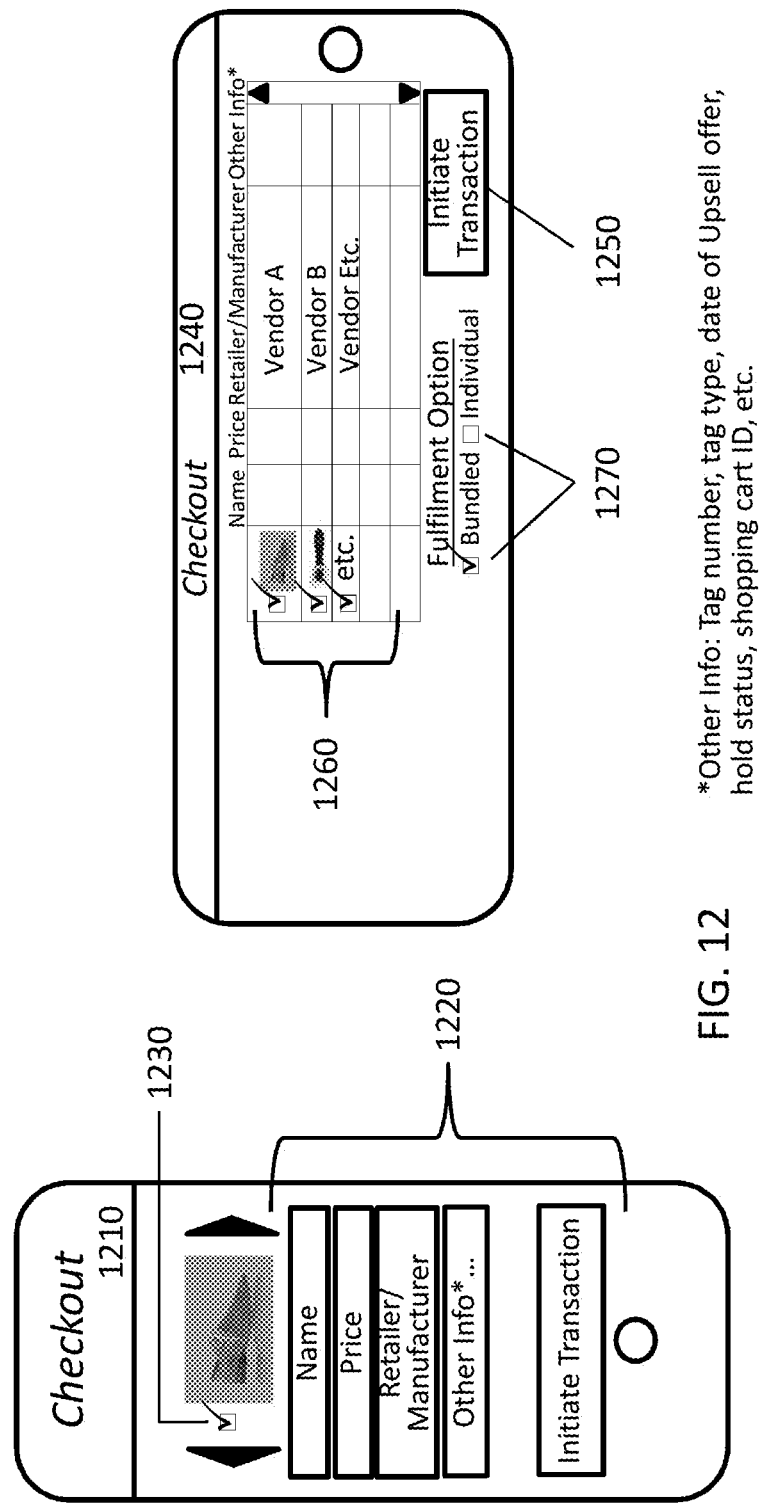
FIG. 12 illustrates an exemplary GUI where a user may make selections when they make a purchase.

FIG. 12 illustrates an exemplary GUI where a user may make selections when they make a purchase. FIG. 12 includes checkout GUIs 1210 and 1240 that display similar information in different formats. Checkout GUI 1210 includes selection boxes 1220 where a user may view or make selections regarding a product. By using selection boxes 1220 a user may view the name of a product, see the price of a product, identify a retailer or manufacturer associated with a product, check other information related to a product, or initiate a transaction. In certain instances selection boxes 1220 may be enabled only when checkbox 1230 is checked. As such, checkbox 1230 may be used to filter what information is displayed in a GUI. When individual selection boxes 1220 are selected, additional information relating to the selected section box may be viewed by a user.

Checkout GUI 1240 includes checkboxes 1260, checkboxes 1270, and initiate a transaction selection box 1250. Checkout GUI also includes selection boxes of products, product names, product prices, retailer/manufacturer, and other information discussed in respect to checkout GUI 1210. Here, however, the information displayed in the GUI is displayed in a table. Checkboxes may be used to select which products be selected for purchase when initiate transaction selection box 1250 is selected Checkboxes 1270 may be used to identify whether a particular order should be bundled in a single transaction with a single vendor or whether an order should be fulfilled via multiple different transactions from one or more vendors. When an order is bundled each of the products selected in checkboxes 1260 may be ordered from a single vendor. When the "individual" selection box of FIG. 12 is selected, different products may be provided by several different vendors, such as vendor A, vendor B, and vendor Etc. of FIG. 12. Like the other GUIs illustrated in the present disclosure, other information that may be displayed in a checkout GUI includes a tag number related to a product identifier, tag type information, a date when an upsell occurred, a hold status, and a shopping cart identifier.

Checkout provides the customer with a summary of the Upsell items to be purchased and allows for customers to initiate the transaction to purchase the items and select the method of fulfilment. The Checkout GUI sends transaction data to the Fulfilment Option Software which sends order data to the Processing Software to executes the requested transaction in accordance with the fulfilment option selected.

Figure 13:
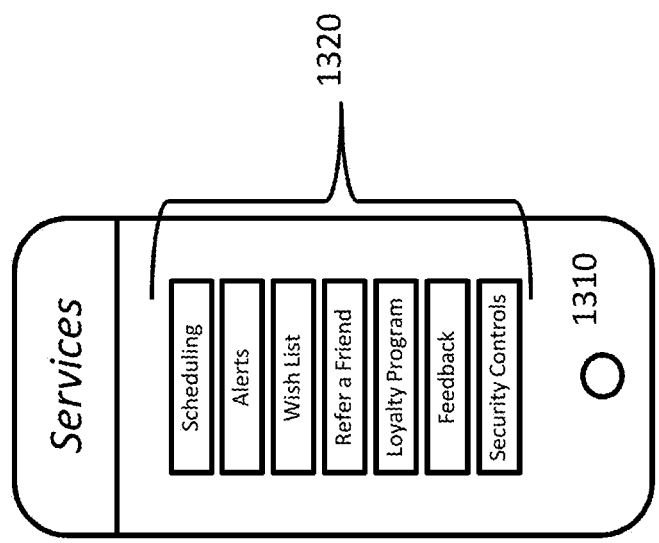
FIG. 13 illustrates an exemplary GUI where a user may select a sub-GUI that relates to a service that benefit a customer.

FIG. 13 illustrates an exemplary GUI where a user may select a sub-GUI that relates to a service that benefits a customer. The services GUI 1310 of FIG. 13 includes selection boxes 1320 that include a scheduling selection box, an alert selection box, a wish list selection box, a refer a friend selection box, a loyalty program selection box, a feedback selection box, and security controls selection box.

When a user selects one of the selection boxes 1320 a sub-GUI relating to that selection may be opened in another GUI at a user device. As such, a user may use services GUI 1310 to view order status in a scheduling GUI, view or set alerts in an alert GUI, view entries that they have added to a wish list in a wish list GUI, view or setup information relating to a friend in a refer a friend GUI, collect rewards via a loyalty program GUI, provide feedback to vendors via a feedback GUI, or to set or modify security settings in a security control GUI.

Services are the Scheduling, Alerts, Wish List, Refer a Friend, Loyalty Program, Feedback and Security Controls provided via GUI's.

Figure 14:
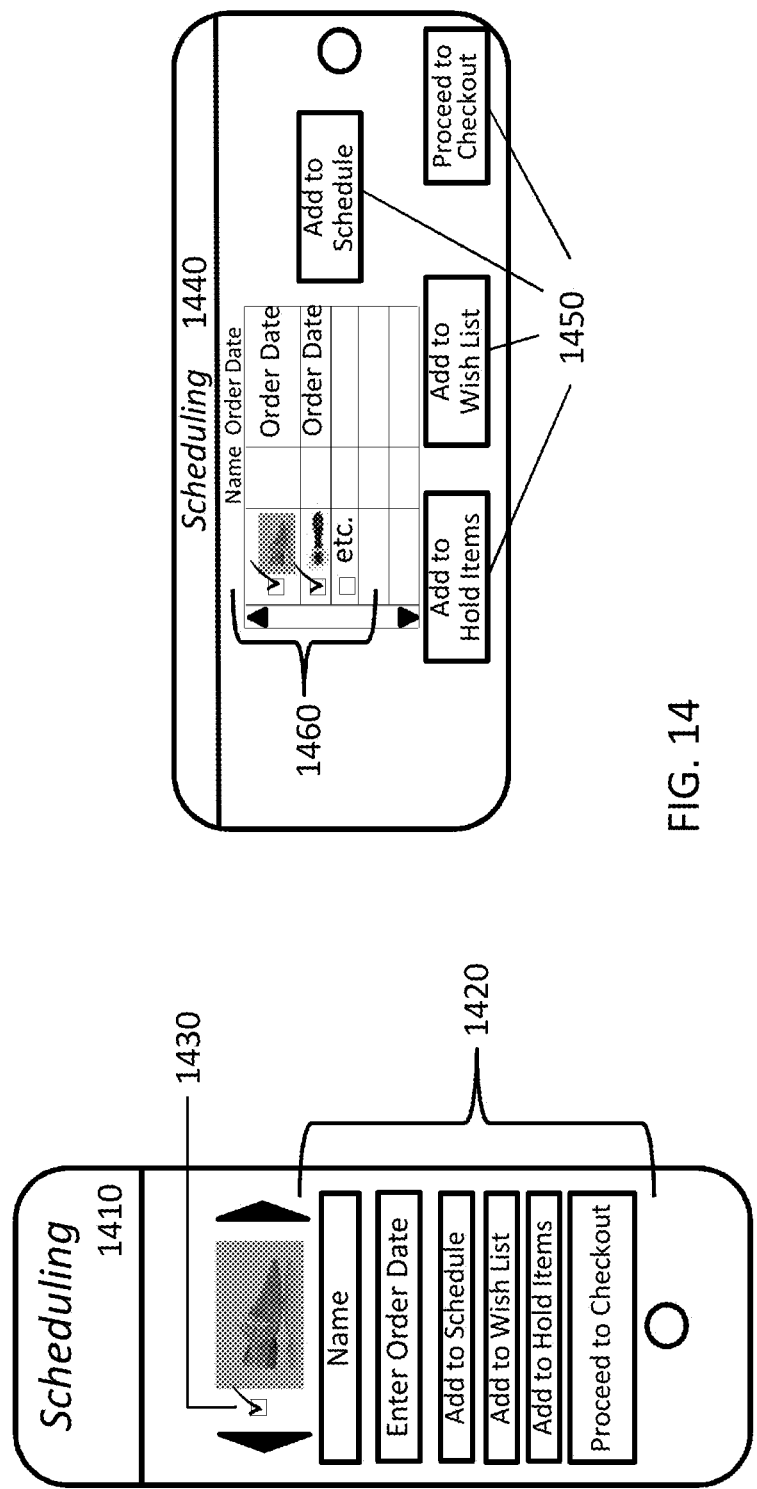
FIG. 14 illustrates exemplary GUIs that a user may use when scheduling the delivery of products they wish to order.

FIG. 14 illustrates exemplary GUIs that a user may use when scheduling the delivery of products they wish to order. Scheduling GUI 1410 includes selection boxes 1420 that identify a name of a product, that provide order entry date, that add a selected product to a wish list, that adds a selected product to a hold items list, or that allows the user to move to a checkout GUI to purchase a product. When checkbox 1430 is checked, the particular product selected may be added to a wish list, added to a hold items list, or be purchased by selecting an appropriate selection box.

FIG. 14 also includes selection GUI 1440 that also displays product names and order dates. Selection GUI 1440 also includes various selection boxes 1450 and checkboxes 1460. Checkboxes 1460 of FIG. 14 allow a user to select products that may be added to a hold items list, added to a wish list, or that purchased by respectively selecting the add to hold items selection box, the add to wish list selection box, or the proceed to checkout selection box of FIG. 14. One other selection box of selection boxes 1450 of FIG. 14 is the "add to schedule" selection box that when selected may allow a user to add a product to a tabulated list of products in selection GUI 1440. In instances when the "add to schedule" selection box is selected, another GUI may be added that allows a user to select products to purchase.

Scheduling provides the customer the ability to input a scheduled purchase for Upsell items. They also have ability to review the Upsell items scheduled to be purchased, add them to the Hold Items and/or the Wish List and/or purchase the items directly from this GUI.

Figure 15:
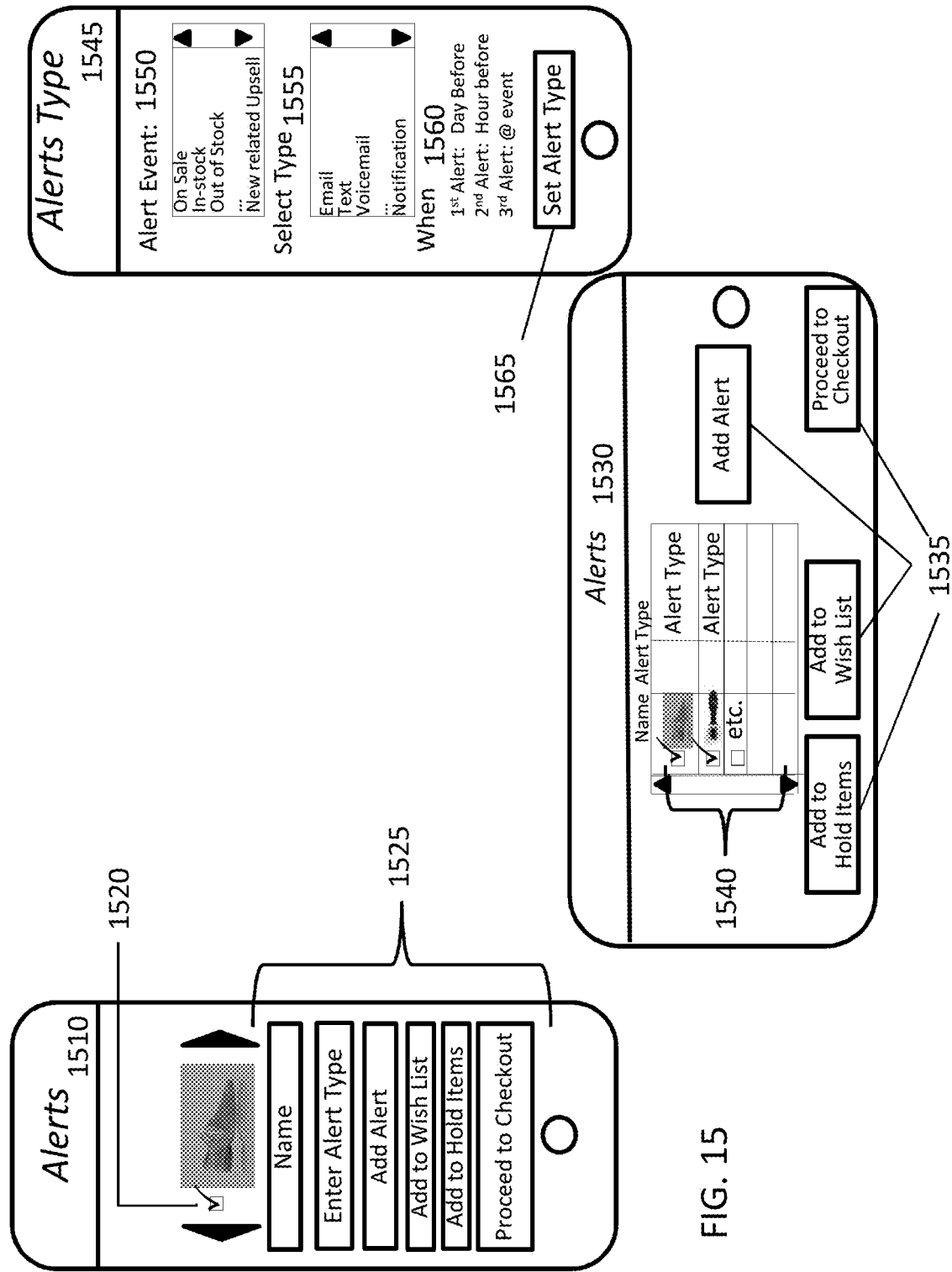
FIG. 15 illustrates exemplary GUIs that may be used to set or change user alert settings or to setup different types of alerts.

FIG. 15 illustrates exemplary GUIs that may be used to set or change user alert settings or to setup different types of alerts. Alerts GUI 1510 includes checkbox 1520 and selection boxes 1525. Checkbox 1525 may be used to select a product and select selection boxes 1525 relating to a purchase. The selection boxes 1525 of alerts GUI 1510 includes the product name, an enter alert type selection box, an add alert selection box, an add to wish list selection box, a hold items selection box, and a proceed to checkout selection box. Here again a product may be added to a wish list, added to a hold list, or purchased by selecting an appropriate selection box. When the enter an alert type selection box is selected the alerts type GUI 1545 may be opened, where the alerts type GUI 1545 may be used by a user to enter or change the types of alerts that may be generated based on user input. When the add alert selection box of alerts GUI 1510 is selected, a user may be allowed to select an alert from a list of alerts.

Alerts GUI 1530 includes selection checkboxes 1540 that may be used by a user to select different products that can be associated with an alert or an alert type. Selection boxes 1535 allow a user to add an alert, add a product to a wish list, to add a product to a hold items list, or to proceed to checkout to purchase a product.

The alerts type GUI 1545 of FIG. 15 allow a user to set different types of alert events 1550 related to informing a user when a product goes on sale, when a product is in-stock, when a product is out of stock, or to send an alert when a new related upsell offering is available. New related upsell offering alerts may identify other products that are related to a product that a user has ordered. For example, after a user has ordered skis and when they have set an alert relating to new added upsell offerings, the user may be provided with a message that identifies that a new ski wax is available for purchase.

Alerts type GUI 1545 also includes selections of alert types 1555 that may be delivered to a user at a preferred selection times 1560. Alert types 1555 of the alerts type GUI 1545 include email, text, and voice mail notifications. A user may receive an email, a text message, or a voice mail when a selected event is scheduled or after an event has occurred. Alerts may be sent a day before a scheduled event, immediately when an event occurs, or an hour after an event has transpired. After a user has set one or more alert type settings in alerts GUI 1545, the user may select the set alert type selection box 1565 to activate their alert settings.

Alerts provides the customer the ability to assign an alert for Upsell items. They also have ability to review the Upsell items assigned an alert, add them to the Hold Items and/or the Wish List and/or purchase the items directly from this GUI. The alert type is defined in the Alert Type GUI.

Alerts Type allows for the customer to define the parameters of the alert to be assigned to the Upsell item. In one embodiment alert parameters are based on the triggering event, the style of alarm and when the alarm will activate relative to the trigger.

Wish List provides the customer the ability to maintain a list of desired Upsell items. They also have ability to review the Upsell items on the list, add them to the Hold Items and/or purchase the items directly from this GUI.

Refer A Friend provides the customer the ability refer an Upsell product to a friend by entering their email address. Other embodiments of this GUI include interfaces with other methods of communications, for example text message, voicemail, social media, etc.

Figure 16:
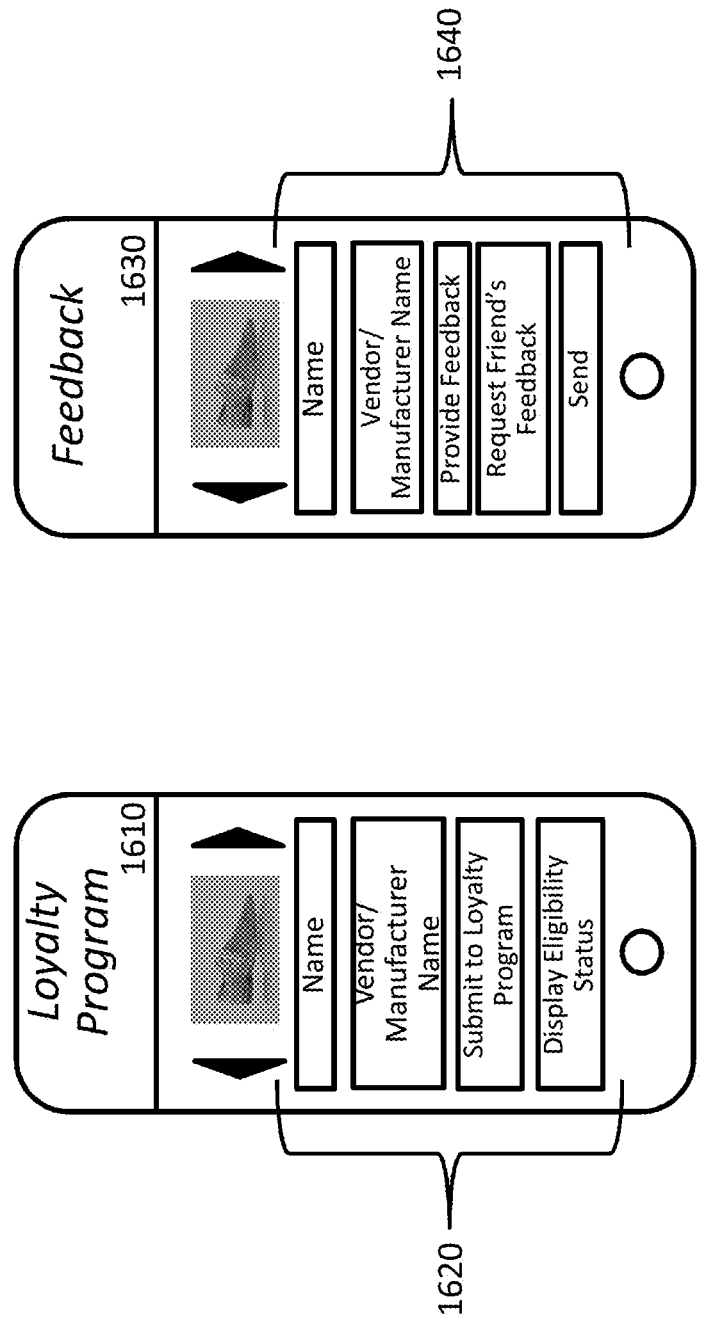
FIG. 16 illustrates two exemplary GUIs that may be used by a user to access a loyalty program or to send feedback to a vendor.

FIG. 16 illustrates two exemplary GUIs that may be used by a user to access a loyalty program or to send feedback to a vendor. Loyalty program 1610 GUI 1610 may allow a user to access loyalty points or view status associated with a loyalty program by interacting with selection boxes 1620. The loyalty program GUI 1610 includes selection boxes that identifies a product name, identifies a vendor/manufacturer, allows a user to submit the product to receive loyalty program rewards, or to display status information relating to the product's eligibility for receiving reward points.

The feedback GUI 1630 of FIG. 16 may allow a customer to provide feedback to a vendor or manufacturer. Feedback GUI includes selection boxes 1640 that identify a product name, identify a vendor/manufacturer, to provide feedback, to request feedback from a friend, or to send a message. A user may enter information relating to their satisfaction by entering information relating to a product purchased using the provide feedback selection box of FIG. 16. Alternatively or additionally a user may request that a friend provide feedback regarding a vendor by selecting the request friend's feedback selection box. Finally, feedback may be sent to a vendor or a friend may be sent a feedback request when a user selected the sent selection box of FIG. 16.

Loyalty Program provides the customer the ability to submit items to vendor/manufactures to redeem loyalty program credit. Information on the product is sent to the vendor/manufacturer to request loyalty program redemption. The vendor/manufacture responds by sending status information to indicate that the item is 1) eligible or not eligible and 2) if eligible, that the loyally benefits have been awarded.

Feedback provides the customer the ability to provide feedback to the vendor/manufacturer. It also provides the ability to request that a friend provide feedback. In another embodiment, response to feedback is displayed and/or feedback from friends is displayed and/or feedback from other customers is displayed and/or other combinations of feedback data is displayed.

Figure 17:
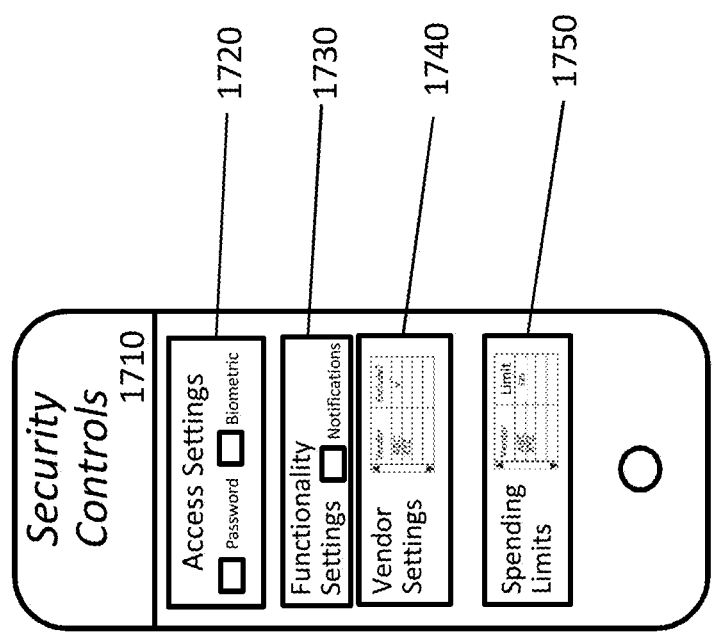
FIG. 17 illustrates an exemplary GUI that allows a user to set various purchase security controls.

FIG. 17 illustrates an exemplary GUI that allows a user to set various purchase security controls. Security controls GUI 1710 of FIG. 17 includes access settings 1720, functionality settings 1730, vendor settings 1740, and spending limit settings 1750. A user using the various settings of FIG. 17 may allow a user to password protect or to biometrically secure any of the GUIs of the present disclosure. These security settings may protect a user device from being used to make orders to those who cannot provide a correct password or an appropriate biometric. Functionality settings selection box 1730 may be used to enable notifications or alerts, vendor settings 1740 may allow a user to identify preferred vendors, and spending limits settings 1750 may cause a checkout GUI consistent with the present disclosure from processing orders that cost more than a threshold amount.

Figure 18:
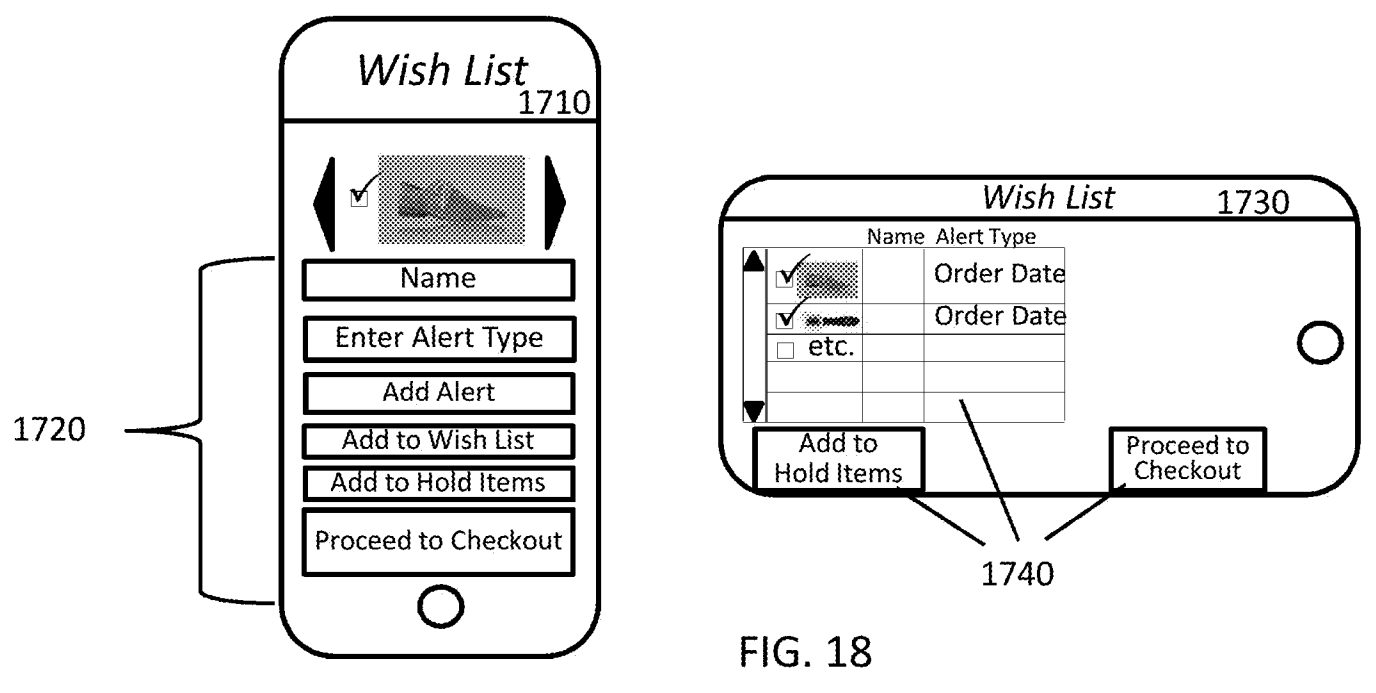

FIG. 18 provides two exemplary Wish List GUIs 1810 and 1830 that provide the customer the ability to maintain a list of desired Upsell items. These GUI's also allow the customer to review the Upsell items on the list, add them to the Hold items and/or purchase the items directly from this GUI by interacting with selection boxes 1820 or 1840.

Figure 19:
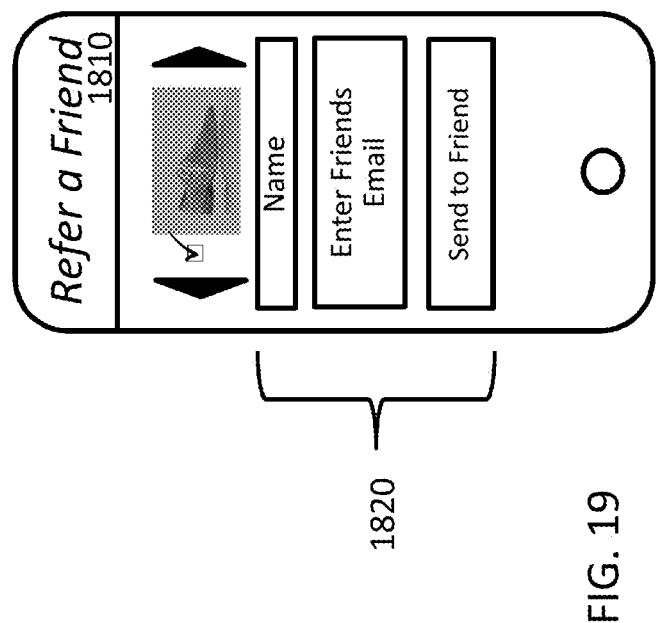
FIG. 19 illustrates an exemplary GUI that allows users to refer an upsell product to a friend.

FIG. 19 Refer A Friend GUI 1910 provides the customer the ability to refer an Upsell product to a friend by interacting with input boxes 1920 to enter their email address. Other embodiments of this GUI include interfaces with other methods of communications, for example text message, voicemail, social media, etc.

Figure 20:
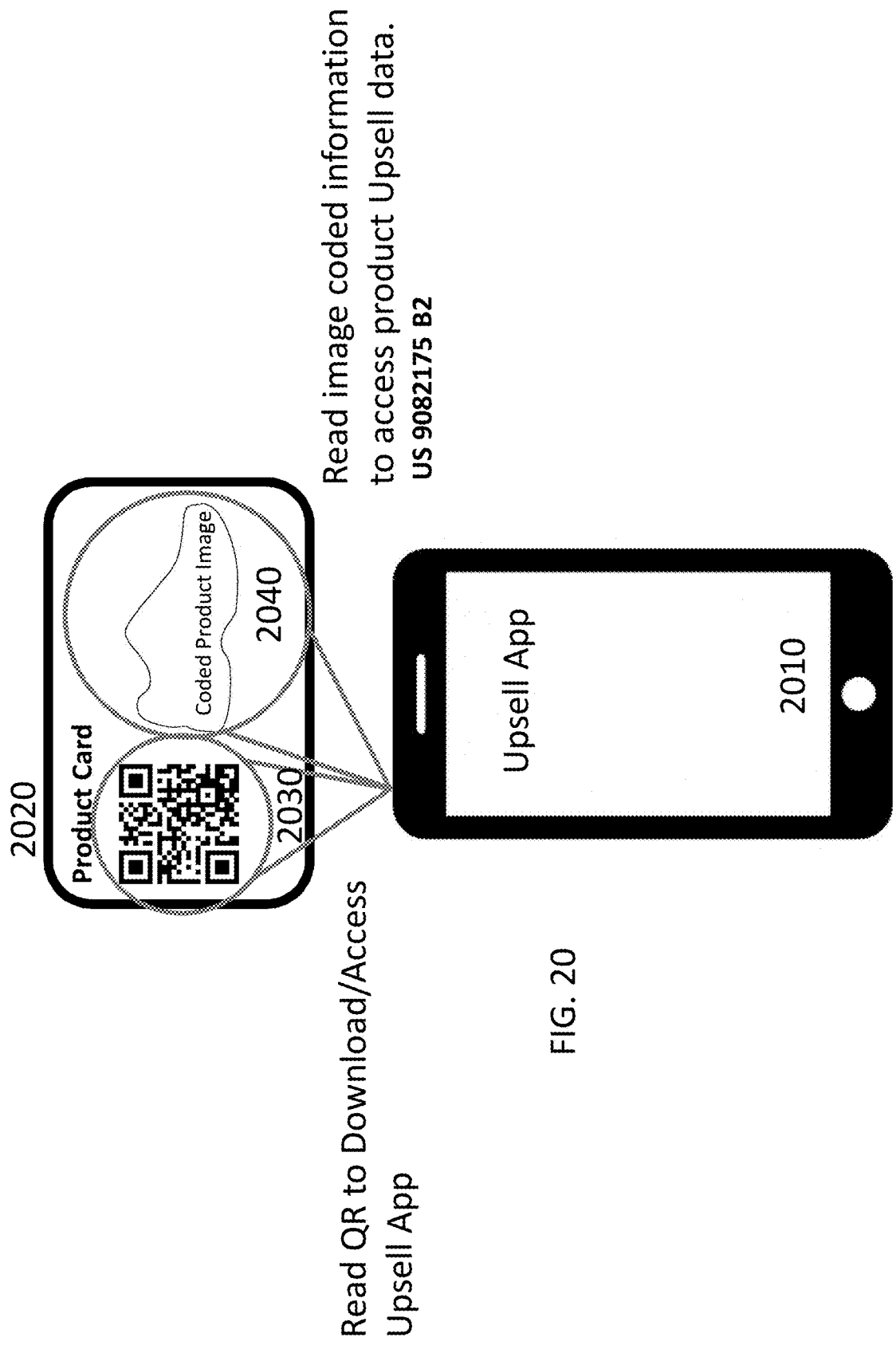
FIG. 20 illustrates a user devices that downloads upsell software and receives information regarding products, catalogs, or packaging options that may be associated with a product.

FIG. 20. illustrates user devices that may receive information regarding products, catalogs, or packaging options that may be associated with a product. FIG. 20 includes a user device 2010, Product Card 2020, a QR or similar printed code 2030, and an image of a retail product 2040. The QR code 2030 is read to download/access the Upsell App and the Product Image 2040 is read to access product Upsell data.

Information relating to the various GUIs or products discussed in the present disclosure may be stored at a user device, be stored in a vendor database, may be stored at an upsell system operated by a third party, or may be stored in various different locations at a user device, at a vendor, or at a third party.

Software at a user device may interact with vendors and with an upsell system when methods consistent with the present disclosure are performed The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

The Security Controls GUI provides access to APP settings that manage the user experience. Access settings controls how the Upsell APP is accessed; this embodiment offers password or biometric authentication. Functionality Settings controls automatic functionality of the Upsell APP; this embodiment allows control of notifications. Vendor Settings allows the user to control which vendor/manufacturers are allowed to offer upsells. Spending limits allows the user to control the maximum spending on upsells. Other embodiments can provide similar options and opportunities to control access to upsell transactions.

What is claimed is:

1. A method for managing offers for additional products or services, the method comprising:

receiving a first set of tag information from a user device based on a scan of a first tag by a reader at the user device, the first set of tag information associated with a first offering for a first product or service, wherein the first product or service is purchased according to the first offering;

receiving a second set of tag information from the user device based on a scan of a second tag by the reader at the user device, the second set of tag information associated with a second offering for a second product or service, wherein the second product or service is not purchased according to the second product or service offering;

receiving a first command from the user device, the first command sent from the user device based on user input that identifies that the second product or service offering should be stored in a hold list, wherein the first command is generated responsive to manual user input;

storing information identifying the second product or service offering in the hold list according to the first command;

receiving a third set of tag information from the user device based on a scan of a third tag by the reader at the user device;

identifying that the third set of tag information is associated with a third product or service that is related to the second product or service;

sending a user configured alert corresponding to the second product or service offering to the user device based on the third product or service being related to the second product or service, the user configured alert identifying those product and service offerings that are to be sent to the user device; and receiving a second command from the user device indicating that a third product or service offering should be placed in a checkout list for purchase, wherein the second command is generated responsive to manual user input subsequent to the sending of the user configured alert, and wherein the third product or service offering is purchased based on the third product or service offering being placed in the checkout list.

2. The method of claim 1, further comprising:
receiving alert configuration information from the user device identifying that offerings for products or services related to the second product or service can be sent to the user device; and
storing the alert configuration information in a database, wherein the user configured alert is sent to the user device after accessing the alert configuration information in the database and the first, the second, and the third set of tag information are wirelessly received at the user device.

3. The method of claim 1, wherein the reader is a camera and the first, the second, and the third set of tag information are scanned as images via the camera.

4. The method of claim 1, wherein the second product or service offering includes one or more of a price of the second product or service, a status associated with an order of the second product or service, a wish list related to the second product or service, or an arrangement for providing products or services related to the second product or service.

5. The method of claim 1, wherein the first tag is inserted into a product package, located on a product package, or located on the product.

6. The method of claim 1, further comprising receiving a third command from the user device ordering the purchase of second product or service, wherein the order to purchase the second product or service is fulfilled based on the receipt of the third command.

7. A non-transitory computer readable storage medium having embodied thereon a program executable by a processor for performing a method for managing offers for additional products or services, the method comprising:
receiving a first set of tag information from a user device based on a scan of a first tag by a reader of the user device, the first set of tag information associated with a first offering for a first product or service, wherein the first product or service is purchased according to the first offering;
receiving a second set of tag information from the user device based on a scan of a second tag by the reader at the user device, the second set of tag information associated with a second offering for a second product or service, wherein the second product or service is not purchased according to the second product or service offering;
receiving a first command from the user device, the first command sent from the user device based on user input that identifies that the second product or service offering should be stored in a hold list, wherein the first command is generated responsive to manual user input;
storing information identifying the second product or service offering in the hold list according to the first command;
receiving a third set of tag information from the user device based on a scan of a third tag by the reader at the user device, the third set of tag information associated with a third product or service that is related to the second product or service;
sending a user configured alert corresponding to the second product or service offering to the user device based on the third product or service being related to the second product or service, the user configured alert identifying those product and service offerings that are to be sent to the user device; and
receiving a second command from the user device indicating that a third product or service offering should be placed in a checkout list for purchase, wherein the second command is generated responsive to manual user input and subsequent to the sending of the user configured alert subsequent issuance of the alert, and wherein the third product or service offering is purchased based on the third product or service offering being placed in the checkout list.

8. The non-transitory computer readable storage medium of claim 7, wherein the first, the second, and the third set of tag information are wirelessly received.

9. The non-transitory computer readable storage medium of claim 7, wherein the first, the second, and the third set of tag information are optically scanned.

10. The non-transitory computer readable storage medium of claim 7, wherein the second product or service offering includes one or more of a price of the second product or service, a status associated with an order of the second product or service, a wish list related to the second product or service, or an arrangement for providing products or services related to the second product or service.

11. The non-transitory computer readable storage medium of claim 7, wherein the first tag is inserted into a product package, located on a product package, or located on the product.

12. An apparatus for managing offers for additional products or services, the apparatus comprising:
a communication interface that:
receives a first set of tag information from a user device based on a scan of a first tag by a reader of the user device, the first set of tag information associated with a first offering for a first product or service, wherein the first product or service is purchased according to the first offering,
receives a second set of tag information based on a scan of a second tag by the reader at the user device, the second set of tag information associated with a second offering for a second product or service, wherein the second product or service is not purchased according to the second offering, and
receives a first command from the user device, the first command sent from the user device based on user input that identifies that the second product or service offering should be stored in a hold list, wherein the first command is generated responsive to manual user input,
a memory that stores information identifying the second product or service offering in the hold list according to the first command; and
a processor that executes instructions out of the memory to:
identify when the communication interface receives a third set of tag information based on a scan of a third tag by the reader at the user device, the third set of tag information associated with a third product or service that is related to the second product or service; and
retrieve the offering of the second product or service from the hold list in memory, wherein:
the communication interface sends a user configured alert corresponding to the retrieved offering to the user device based on the third product or service being related to the second product or service, the user configured alert identifying those product and service offerings that are to be sent to the user device,
the communication interface also receives a second command from the user device indicating that a third product or service offering should be placed in a checkout list, the second command generated responsive to manual user input subsequent to the sending of the user configured alert, and the third product or service offering is purchased based on the third product or service offering being placed in the checkout list.

13. The apparatus of claim 12, wherein the communication interface is a wireless communication interface that wirelessly receives the first, the second, and the third set of tag information.

14. The apparatus of claim 12, wherein the first, the second, and the third set of tag information is scanned as images by a camera.

15. The apparatus of claim 12, wherein the second product or service offering includes one or more of a price of the second product or service, a status of the second product or service, a wish list related to the second product or service, or an arrangement for providing products or services related to the second product or service.

16. The apparatus of claim 12, wherein the first tag is inserted into a product package, located on a product package, or located on the product.

17. A method for presenting an managing offers for an additional product or service, the method comprising:

receiving a first set of tag information from a user device based on a scan of a first tag by a reader at the user device, the first set of tag information associated with a first offering for a first product or service, wherein the first product or service is purchased according to the first offering;

receiving a second set of tag information associated with a second product or service from the user device, wherein the second set of tag information is received based on a scan of a second tag by the reader at the user device and the second set of tag information is associated with an offering for the second product or service;

receiving a first command from the user device, the first command sent from the user device based on user input that identifies that the second product or service offering should be stored in a hold list, wherein the first command is generated responsive to manual user input;

storing information identifying the second product or service offering in the hold list according to the first command;

receiving a third set of tag information based on a scan of a third tag by the reader, the third set of tag information associated with a third product or service that is related to the second product or service;

sending a user configured alert corresponding to the second product or service offering to the user device based on the second product or service offering being stored in the hold list, the user configured alert identifying those product and service offerings that are to be sent to the user device; and receiving a second command from the user device indicating that a third product or service offering should be placed in a checkout list for purchase, wherein the second command is generated responsive to manual user input and subsequent to the sending of the user configured alert, and wherein the third product or service offering is purchased based on the third product or service offering being placed in the checkout list.

18. The method of claim 17, wherein first tag is inserted into a product or service package.

19. The method of claim 17, wherein the first tag is located on a product or service package.

20. The method of claim 17, wherein the first tag is located on the product.

21. The method of claim 17, wherein the first, the second, and the third set of tag information are wirelessly scanned.

22. The method of claim 17, wherein the first set, the second set, and the third set of tag information are optically scanned.

23. The method of claim 17, wherein other products or services are provided by an identified retailer based on the first set of tag information.

24. The method of claim 17, wherein other products or services related to the first product are provided by an identified retailer that also provides products or services related to the second product.

25. The method of claim 17, wherein the second product or service is provided by a different provider than the third second product or service.

26. The method of claim 17, wherein the first product or service offering is from a first provider, and the second product or service offering is from a second provider.

* * * * *